US011860706B2

(12) United States Patent
Sugiyama et al.

(10) Patent No.: US 11,860,706 B2
(45) Date of Patent: Jan. 2, 2024

(54) ACCESSORY, POWER MANAGEMENT IC, AND COMMUNICATION SYSTEM

(71) Applicant: Sony Semiconductor Solutions Corporation, Kanagawa (JP)

(72) Inventors: Satoshi Sugiyama, Kanagawa (JP); Naoya Arisaka, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 114 days.

(21) Appl. No.: 17/610,838

(22) PCT Filed: Mar. 16, 2020

(86) PCT No.: PCT/JP2020/011388
§ 371 (c)(1),
(2) Date: Nov. 12, 2021

(87) PCT Pub. No.: WO2020/235195
PCT Pub. Date: Nov. 26, 2020

(65) Prior Publication Data
US 2022/0214739 A1     Jul. 7, 2022

(30) Foreign Application Priority Data
May 20, 2019   (JP) .................. 2019-094319

(51) Int. Cl.
*G06F 1/3212*   (2019.01)
*G06F 1/3246*   (2019.01)
*G06F 1/3296*   (2019.01)

(52) U.S. Cl.
CPC .......... *G06F 1/3212* (2013.01); *G06F 1/3246* (2013.01); *G06F 1/3296* (2013.01)

(58) Field of Classification Search
CPC .... G06F 1/3212; G06F 1/3246; G06F 1/3296; H01M 10/425; H01M 10/48;
(Continued)

(56) References Cited

U.S. PATENT DOCUMENTS

2009/0039833 A1   2/2009   Kitagawa
2011/0055407 A1*  3/2011   Lydon ............... G06F 13/387
                                              709/228
(Continued)

FOREIGN PATENT DOCUMENTS

JP   2017-123653 A   7/2017
JP   2018-068041 A   4/2018
(Continued)

OTHER PUBLICATIONS

International Search Report (PCT/ISA/210), International Application No. PCT/JP2020/011388, dated Apr. 2, 2020.

*Primary Examiner* — Chun Cao
(74) *Attorney, Agent, or Firm* — Michael Best & Friedrich LLP

(57) ABSTRACT

Communication systems including a case and an accessory are disclosed. In one example, the case supplies electric power. The accessory is connectable to the case with a charging line and a GND line. The charging line transmits and receives a charging signal. The GND line is set to a reference voltage. The accessory includes a requested-operation determination circuit that, based on a voltage level of the charging signal and on a duration time of the voltage level, determines one operation requested of the accessory. In another example, a power management IC is included in the accessory and connected to the case with a charging line and a GND line. The power management IC includes a requested-operation determination circuit that, based on a voltage level of the charging signal and on a duration time of the voltage level, determines one operation requested of the accessory.

16 Claims, 17 Drawing Sheets

(58) Field of Classification Search
CPC . H01M 2010/4271; H01M 2010/4278; H01M 50/247; H02J 7/00034; H02J 7/342; Y02E 60/10
USPC .......................................................... 713/323
See application file for complete search history.

(56) References Cited

U.S. PATENT DOCUMENTS

| | | | |
|---|---|---|---|
| 2011/0103608 A1* | 5/2011 | Wu .......................... | H04R 5/04 |
| | | | 381/74 |
| 2014/0125312 A1* | 5/2014 | Mullins .................. | G01R 31/28 |
| | | | 324/71.1 |
| 2018/0026461 A1 | 1/2018 | Rich et al. | |
| 2019/0379216 A1* | 12/2019 | Yoon .................... | H04R 1/1025 |

FOREIGN PATENT DOCUMENTS

| | | | |
|---|---|---|---|
| JP | 2018068041 A | * | 4/2018 |
| JP | 2018-182816 A | | 11/2018 |
| JP | 2018182816 A | * | 11/2018 |
| WO | WO-2013162816 A1 | | 10/2013 |
| WO | 2014/203490 A1 | | 12/2014 |

* cited by examiner

ACCESSORY, POWER MANAGEMENT IC, AND COMMUNICATION SYSTEM

TECHNICAL FIELD

The present disclosure relates to an accessory for transmitting and receiving signals to and from a case, a power management IC included in the accessory, and a communication system including the accessory.

BACKGROUND ART

Charging and communication operations are performed between a case (e.g., a docking station) and an accessory such as a pair of wireless earphones. A configuration in which two connection lines (a charging line and a GND line) are used for connection is used as a configuration for connecting the case to the accessory.

A system disclosed, for example, in PTL 1 exercises on-off control over an enable signal outputted from a driver of a case with respect to a power supply terminal of an accessory that is connected to the case with two connection lines, and establishes communication depending on whether or not the enable signal is superimposed on an outputted communication signal.

CITATION LIST

Patent Literature

[PTL 1]
U.S. Patent Application Publication No. 2018/0026461

SUMMARY

Technical Problem

However, the technology disclosed in PTL 1 requires the use of a separation circuit for separating the enable signal from the communication signal on which the enable signal is superimposed. Therefore, the technology disclosed in PTL 1 has a problem where circuitry is complicated.

In order to address the above problem, the present technology has an objective to provide an accessory, a power management IC, and a communication system that are capable of allowing the use of simplified circuitry.

Solution to Problem

An accessory according to an aspect of the present technology is connectable to a case with a charging line and a GRD line. The charging line transmits and receives a charging signal. The GSD line is set to a reference voltage. The accessory includes a requested-operation determination circuit. Based on a voltage level of the charging signal and on a duration time of the voltage level, the requested-operation determination circuit determines one operation requested of the accessory.

A power management IC according to another aspect of the present technology is included in an accessory, connected to a case with a charging line and a GND line, and provided with a requested-operation determination circuit. The accessory operates on electric power. The case is capable of supplying the electric power. The charging line transmits and receives a charging signal. The GND line is set to a reference voltage. Based on a voltage level of the charging signal and on a duration time of the voltage level, the requested-operation determination circuit determines one operation requested of the accessory.

A communication system according to still another aspect of the present technology includes a case and an accessory. The case is capable of supplying electric Power. The accessory is connectable to the case with a charging line and a GND line. The charging line transmits and receives a charging signal. The GND line is set to a reference voltage. The accessory includes a requested-operation determination circuit. Based on a voltage level of the charging signal and on a duration time of the voltage level, the requested-operation determination circuit determines one operation requested of the accessory.

A communication system according to yet another aspect of the present technology includes a case, an accessory, and a power management IC. The case is capable of supplying electric power. The accessory operates on electric power. The power management IC is included in the accessory and connected to the case with a charging line and a GND line. The charging line transmits and receives a charging signal. The GND line is set to a reference voltage. Further, the power management IC includes a requested-operation determination circuit. Based on a voltage level of the charging signal and on a duration time of the voltage level, the requested-operation determination circuit determines one operation requested of the accessory.

DESCRIPTION OF EMBODIMENTS

Embodiments of the present technology will now be described with reference to the accompanying drawings.

Identical or similar portions in the accompanying drawings are designated by identical or similar reference signs and will not be redundantly described. The accompanying drawings are schematic and may depict a situation different from reality. The embodiments described below illustrate equipment and methods for embodying the technical idea of the present technology. The technical idea of the present technology is not specifically limited to the equipment and methods illustrated in conjunction with the embodiments described below. The technical idea of the present technology may be modified variously within the technical scope described in the appended claims.

First Embodiment

Figure 1:
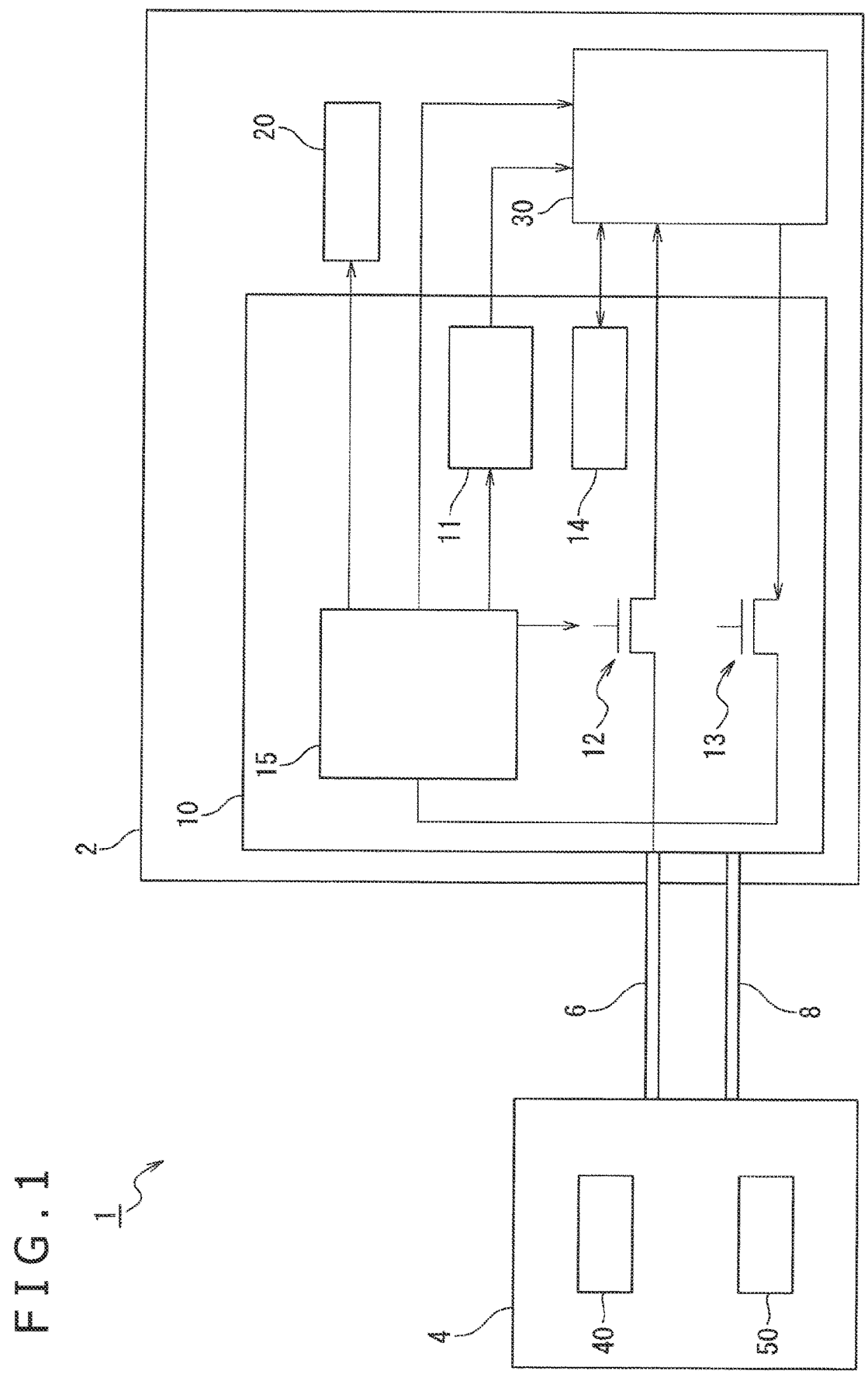
FIG. 1 is a diagram illustrating a configuration of a communication system according to a first embodiment.

As depicted in FIG. 1, a communication system 1 includes an accessory 2 and a case 4. The accessory 2 operates on electric power. The case 4 is capable of supplying the electric power.

The accessory 2 and the case 4 are connected with two connection lines (a charging line 6 and a GND line 8).

The charging line 6 is formed by bringing terminals (charging terminals (Vin)) individually formed on the accessory 2 and the case 4 into contact, and used to transmit and receive a charging signal.

The GND line 8 is formed by bringing terminals (GND terminals (GND)) individually formed on the accessory 2 and the case 4 into contact, as is the case with the charging line 6, and set to a reference voltage (e.g., 0 V).

Configuration of Accessory

The accessory 2 includes a power management unit (PMU) 10, an accessory battery 20, and a signal processing circuit 30.

The first embodiment is described below with reference to a case where the accessory 2 is, for example, a pair of wireless earphones that acquires audio data (sound data) from, for instance, music reproduction equipment through Bluetooth (registered trademark) or other wireless communication, and outputs a sound based on the sound data.

PMU

The PMU 10 includes a regulator 11, a reception path 12, a transmission path 13, a register 14, and a requested-operation determination circuit 15.

The regulator 11 receives a command signal inputted from the requested-operation determination circuit 15, and outputs the command signal to the signal processing circuit 30. Further, the regulator 11 includes a DC-DC converter and an LDO (Low Drop Out).

The DC-DC converter is a circuit that switches input power with a switching element at a relatively high speed, and rectifies and smooths the switched input power to obtain DC power having a desired voltage. Further, the DC-DC converter has a wider input voltage variation range than the LDO.

The LDO is a series regulator that controls the amount of voltage drop in a transistor element to obtain DC power having a desired voltage. Further, the LDO has a narrower input voltage variation range than the DC-DC converter, and provides highly efficient voltage conversion in a case where an input voltage is slightly higher than an output voltage.

The reception path 12 is connected to the signal processing circuit 30 and to the charging terminal that is connected to the charging line 6.

Further, when a reception route connection signal (RxON signal) is inputted from the requested-operation determination circuit 15, the reception path 12 connects a signal transmission route from the charging terminal to the signal processing circuit 30. The reception route connection signal is a command signal that connects the signal transmission route from the charging terminal to the signal processing circuit 30.

Further, when a reception route blocking signal (RxOFF signal) is inputted from the requested-operation determination circuit 15, the reception path 12 blocks the signal transmission route from the charging terminal to the signal processing circuit 30. The reception route blocking signal is a command signal that blocks the signal transmission route from the charging terminal to the signal processing circuit 30.

The transmission path 13 is connected to the charging terminal and the signal processing circuit 30. The transmission path 13 and the signal processing circuit 30 are connected by using, for example, a UART (Universal Asynchronous Receiver Transmitter).

Further, when a transmission route connection signal (TxON signal) is inputted from the signal processing circuit 30, the transmission path 13 connects a signal transmission route from the signal processing circuit 30 to the charging terminal. The transmission route connection signal is a command signal that connects the signal transmission route from the signal processing circuit 30 to the charging terminal.

Further, when a transmission route blocking signal (TxOFF signal) is inputted from the signal processing circuit 30, the transmission path 13 blocks the signal transmission route from the signal processing circuit 30 to the charging terminal. The reception route blocking signal is a command signal that blocks the signal transmission route from the signal processing circuit 30 to the charging terminal.

The register 14 is connected to the signal processing circuit 30 by using, for example, an I2C (Inter-Integrated Circuit).

Further, based on the command signal inputted from the requested-operation determination circuit 15, the register 14 inputs, to the signal processing circuit 30, the transmission route connection signal or the transmission route blocking signal to be inputted to the transmission path 13.

Based on the voltage level of the charging signal inputted from the case 4 through the charging line 6 and on the duration time of the voltage level of the charging signal, the requested-operation determination circuit 15 determines (identifies) one operation requested of the accessory 2.

Operations that can be requested of the accessory 2 include a recovery operation and a communication operation. The recovery operation recovers the signal processing circuit 30 from a sleep state. The communication operation provides one-way communication from the case 4 to the requested-operation determination circuit 15 and two-way communication (one-way communication and two-way communication) between the signal processing circuit 30 and the case 4. Further, the operations that can be requested of the accessory 2 include a charging operation, an initialization operation, and a sleep operation. The charging operation charges the accessory battery 20. The initialization operation initializes (resets) the system of the accessory 2. The sleep operation switches the running signal processing circuit 30 into the sleep state.

It should be noted that the communication between the accessory 2 and the case 4 may include, for example, a communication for indicating the remaining capacity (remaining battery level) of a later-described case battery 40 by using a blinking or steadily glowing LED.

Figure 2:
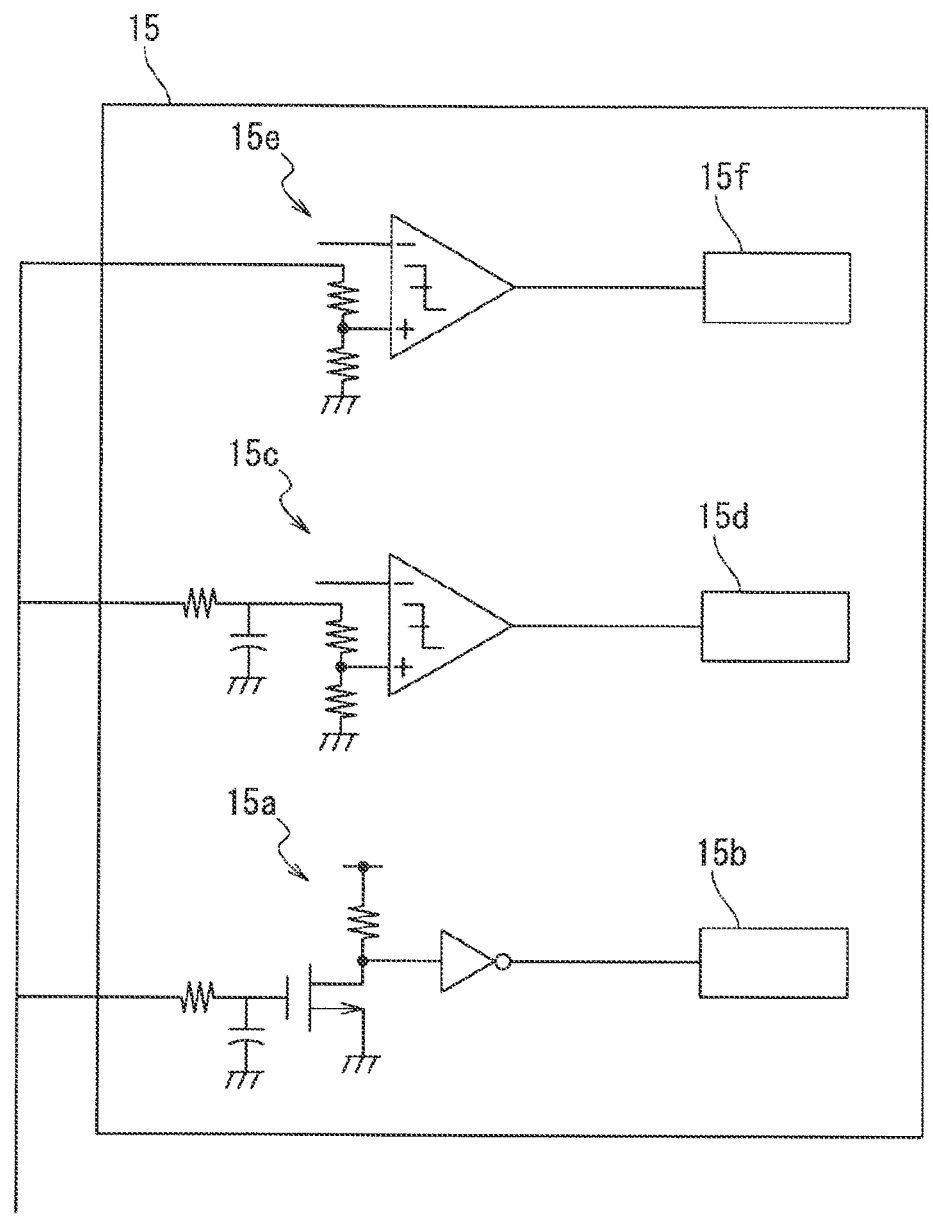
FIG. 2 is a diagram illustrating a configuration example of a requested-operation determination circuit.

The requested-operation determination circuit 15 may be configured as depicted, for example, in FIG. 2.

The configuration depicted in FIG. 2 indicates, as an example, that the requested-operation determination circuit 15 includes a first determination section 15*a*, a first counter processing section 15*b*, a second determination section 15*c*, a second counter processing section 15*d*, a third determination section 15*e*, and a third counter processing section 15*f*.

Upon receiving an input of the charging signal, the first determination section 15*a* determines whether the voltage level of the inputted charging signal is higher than the reference voltage and lower than a preset first threshold voltage. In a case where the voltage level of the inputted charging signal is higher than the reference voltage and lower than a preset first threshold voltage, the first determination section 15*a* outputs the charging signal to the first counter processing section 15*b*. Meanwhile, in a case where the voltage level of the inputted charging signal is higher than the reference voltage and not lower than the first threshold voltage, the first determination section 15*a* allows the charging signal to flow to a ground terminal.

Upon receiving an input of the charging signal, the first counter processing section 15*b* determines whether or not the voltage level of the charging signal has remained higher than the reference voltage and lower than the first threshold voltage for a preset first threshold period (e.g., several milliseconds). If it is not determined that the voltage level of the charging signal has remained higher than the reference voltage and lower than the first threshold voltage for the first threshold period, the first determination section 15*a* concludes that the one operation requested of the accessory 2 is the recovery operation. Meanwhile, if it is determined that the voltage level of the charging signal has remained higher than the reference voltage and lower than the first threshold voltage for the first threshold period, the first determination section 15*a* concludes that the one operation requested of the accessory 2 is the communication operation.

Further, if the voltage level of the inputted charging signal, which has been higher than the reference voltage, lowers to the reference voltage, the first determination section 15*a* determines that the one operation requested of the accessory 2 is the sleep operation.

Upon receiving an input of the charging signal, the second determination section 15*c* determines whether the voltage level of the inputted charging signal is not lower than the first threshold voltage and is lower than a second threshold voltage that is preset to be higher than the first threshold voltage. In a case where the voltage level of the inputted charging signal is not lower than the first threshold voltage and is lower than the second threshold voltage, the second determination section 15*c* outputs the charging signal to the second counter processing section 15*d*. Meanwhile, in a case where the voltage level of the inputted charging signal is not lower than the second threshold voltage, the second determination section 15*c* allows the charging signal to flow to the ground terminal.

Upon receiving an input of the charging signal, the second counter processing section 15*d* determines whether or not the voltage level of the charging signal has remained higher than the first threshold voltage and lower than the second threshold voltage for a preset second threshold period (e.g., several milliseconds). It should be noted that the second threshold period may be equal to the first threshold period. If it is not determined that the voltage level of the charging signal has remained higher than the first threshold voltage and lower than the second threshold voltage for the second threshold period, the second determination section 15*c* continues with determination. Meanwhile, if it is determined that the voltage level of the charging signal has remained higher than the first threshold voltage and lower than the second threshold voltage for the second threshold period, the second determination section 15*c* concludes that the one operation requested of the accessory 2 is the charging operation.

Upon receiving an input of the charging signal, the third determination section 15*e* determines whether the voltage level of the inputted charging signal is not lower than the second threshold voltage. In a case where the voltage level of the inputted charging signal is not lower than the second threshold voltage, the third determination section 15*e* outputs the charging signal to the third counter processing section 15*f*.

Upon receiving an input of the charging signal, the third counter processing section 15*f* determines whether or not the voltage level of the charging signal has remained higher than the second threshold voltage for a preset third threshold period (e.g., several milliseconds). It should be noted that the third threshold period may be equal, for example, to the first threshold period. If it is not determined that the voltage level of the charging signal has remained higher than the second threshold voltage for the third threshold period, the third determination section 15*e* continues with determination. Meanwhile, if it is determined that the voltage level of the charging signal has remained higher than the second threshold voltage for the third threshold period, the third determination section 15*e* concludes that the one operation requested of the accessory 2 is initialization operation.

Consequently, when determining the one operation requested of the accessory 2, the requested-operation determination circuit 15 performs processes (I) to (V) below.

Process (I)

Upon detecting that the voltage level of the charging signal higher than the reference voltage and lower than the first threshold voltage, the requested-operation determination circuit 15 determines that the one operation requested of the accessory 2 is the recovery operation.

When it is determined that the one operation requested of the accessory 2 is the recovery operation, the requested-operation determination circuit 15 outputs a command signal (system recovery signal) for causing the signal processing circuit 30 to switch into a standby state. Additionally, the requested-operation determination circuit 15 outputs a command signal (power ON signal) to the regulator 11 in order to supply electric power to the signal processing circuit 30.

Process (II)

In a case where the voltage level of the charging signal has remained higher than the reference voltage and lower than the first threshold voltage for the first threshold period, the requested-operation determination circuit 15 determines that the one operation requested of the accessory 2 is the communication operation.

When it is determined that the one operation requested of the accessory 2 is the communication operation, the requested-operation determination circuit 15 outputs the reception route connection signal to the reception path 12.

Thereafter, when the charging signal is inputted to the signal processing circuit 30, the requested-operation determination circuit 15 outputs the reception route blocking signal to the reception path 12. Additionally, the requested-operation determination circuit 15 outputs a command signal to the register 14 in order to input the transmission route connection signal to the signal processing circuit 30.

Further, when a communication signal outputted from the signal processing circuit 30 is inputted to the case 4, the requested-operation determination circuit 15 outputs a command signal to the register 14 in order to input the transmission route blocking signal to the signal processing circuit 30.

Process (III)

In a case where the voltage level of the charging signal has remained not lower than the first threshold voltage for the second threshold period, the requested-operation determination circuit 15 determines that the one operation requested of the accessory 2 is the charging operation.

When it is determined that the one operation requested of the accessory 2 is the charging operation, the requested-operation determination circuit 15 outputs the charging signal to the accessory battery 20.

Process (IV)

In a case where the voltage level of the charging signal has remained not lower than the second threshold voltage for the third threshold period, the requested-operation determination circuit 15 determines that the one operation requested of the accessory 2 is the initialization operation.

When it is determined that the one operation requested of the accessory 2 is the initialization operation, the requested-operation determination circuit 15 outputs a command signal to the regulator 11, the reception path 12, the transmission path 13, the register 14, and the signal processing circuit 30 in order to initialize their states.

Process (V)

In a case where the voltage level of the charging signal, which has been higher than the reference voltage, lowers to the reference voltage, the requested-operation determination circuit 15 determines that the one operation requested of the accessory 2 is the sleep operation.

When it is determined that the one operation requested of the accessory 2 is the sleep operation, the requested-operation determination circuit 15 outputs a command signal (power OFF signal) to the regulator 11 in order to shut off the power supply to the signal processing circuit 30.

(Accessory Battery)

The accessory battery 20 is, for example, a rechargeable lithium-ion battery. The charging signal is supplied to the accessory battery 20 through the requested-operation determination circuit 15. Further, the accessory battery 20 supplies power to the PMU 10 and the signal processing circuit 30.

(Signal Processing Circuit)

The signal processing circuit 30 receives a signal input from the requested-operation determination circuit 15 and the regulator 11. Further, the signal processing circuit 30 inputs and outputs signals to and from the register 14.

Further, the signal processing circuit 30 in the sleep state receives an input of the system recovery signal from the requested-operation determination circuit 15, and upon receiving power supplied from the regulator 11, the signal processing circuit 30 switches into the standby state. Additionally, when the power supply is shut off from the regulator 11, the signal processing circuit 30 in the standby state switches into the sleep state.

Further, upon receiving, from the register 14, an input of a command signal for inputting the transmission route connection signal to the signal processing circuit 30, the signal processing circuit 30 outputs the transmission route connection signal to the transmission path 13. Additionally, upon receiving, from the register 14, an input of a command signal for inputting the transmission route blocking signal to the signal processing circuit 30, the signal processing circuit 30 outputs the transmission route blocking signal to the transmission path 13.

Configuration of Case

The case 4 functions as a docking station capable of docking the accessory 2. Further, the case 4 includes a case battery 40 and a signal control section 50.

The case battery 40, which is, for example, a rechargeable lithium-ion battery, outputs the charging signal to the accessory 2 through the charging line 6. Therefore, the case 4 is able to supply power to the accessory 2. It should be noted that the case battery 40 can be charged by supplying power from the outside, for example, through a common power outlet.

The signal control section 50 controls the voltage level of the charging signal to be outputted to the accessory 2 through the charging line 6 and the duration time of the voltage level. Control exercised over the charging signal by the signal control section 50 is based on the one operation requested of the accessory 2.

Operations and Effects

Referring to FIGS. 1 and 2 and based on FIGS. 3 to 16, operations performed by the communication system 1 and effects produced by the operations performed by the communication system 1 will now be described. The following description assumes that the case 4 and the accessory 2 are not connected, and that the signal processing circuit 30 is in the sleep state, and further that the signal transmission route from the charging terminal to the signal processing circuit 30 and the signal transmission route from the signal processing circuit 30 to the charging terminal are blocked.

Figure 3:
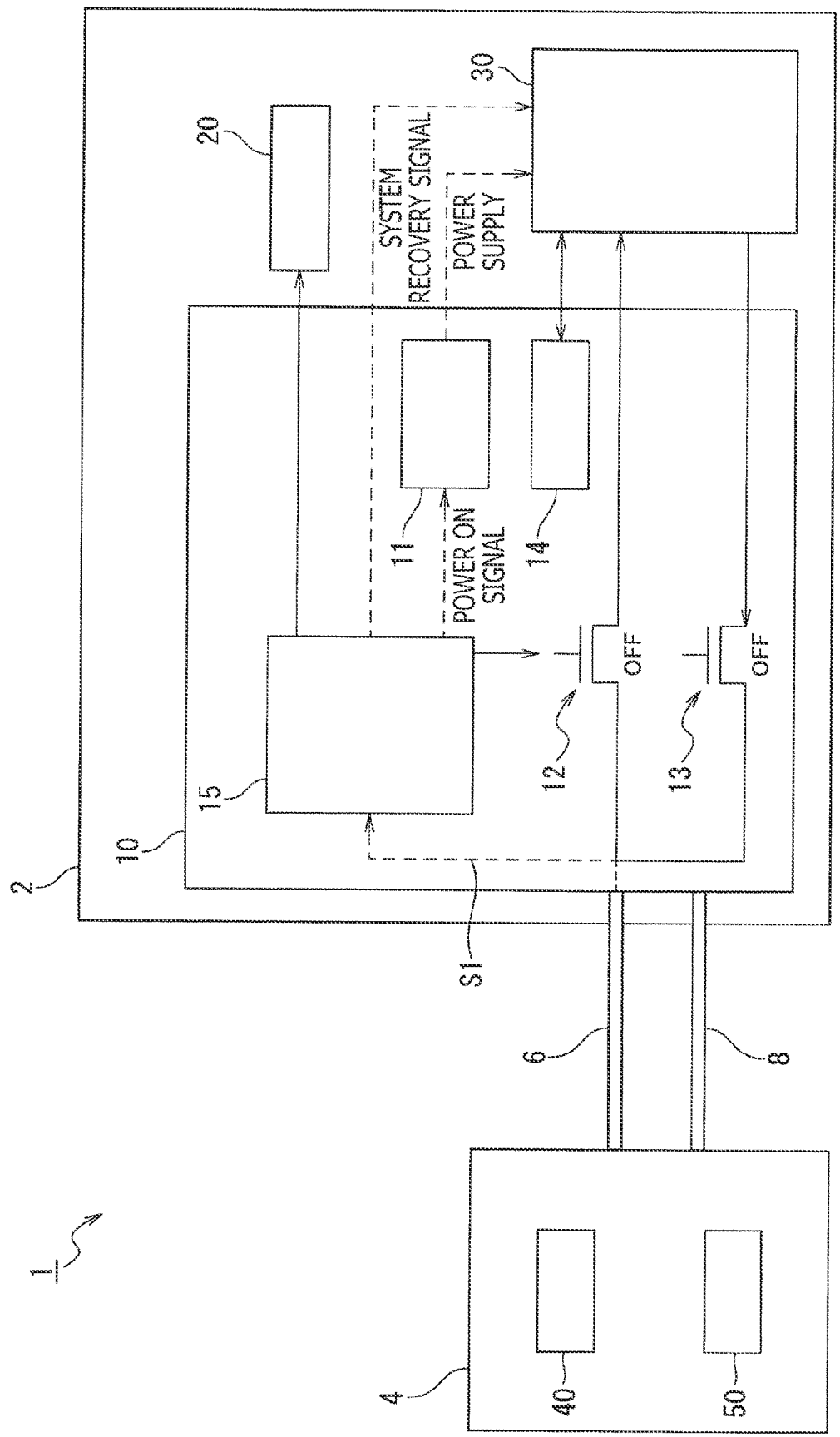
FIG. 3 is a diagram illustrating operations performed by the communication system.
Figure 4:
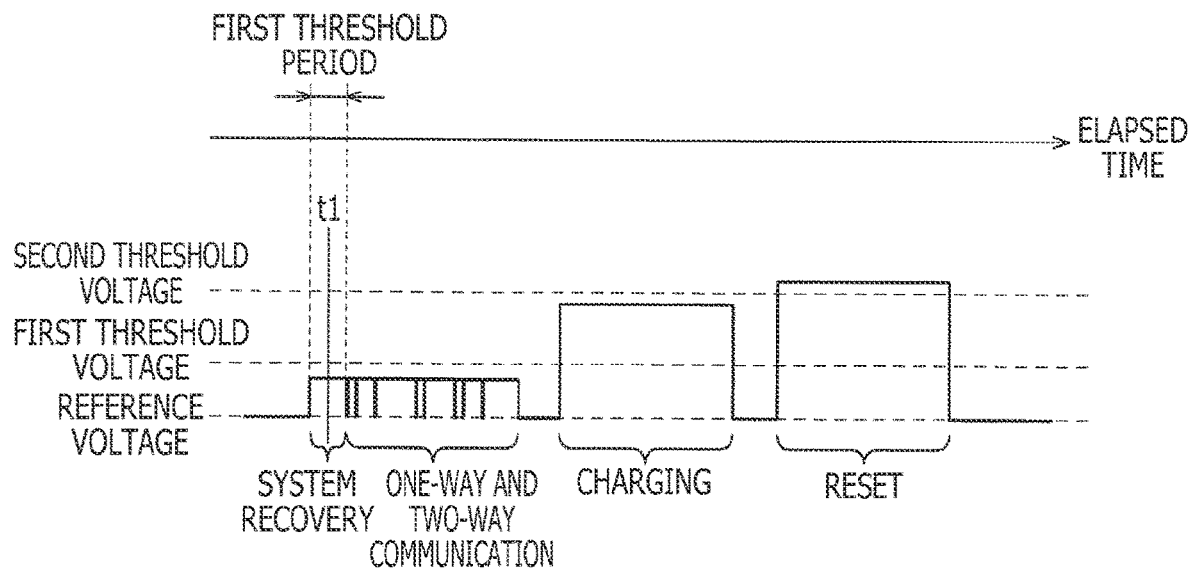
FIG. 4 is a timing diagram illustrating operations performed by the communication system.

It should be noted that, in FIG. 3 or the like, the state where the signal transmission route from the charging terminal to the signal processing circuit 30 is blocked and the state where the signal transmission route from the signal processing circuit 30 to the charging terminal is blocked may be referred to as the "OFF" state. Similarly, the state where the signal transmission route from the charging terminal to the signal processing circuit 30 is connected and the state where the signal transmission route from the signal processing circuit 30 to the charging terminal is connected may be referred to as the "ON" state.

In a case where, for example, the remaining power of the accessory battery 20 is low during the use of the accessory 2, the accessory 2 and the case 4 are connected with the charging line 6 and the GND line 8 in order, for example, to charge the accessory battery 20.

When the accessory 2 and the case 4 are connected, that is, the charging terminals and the GND terminals formed on the accessory 2 and the case 4 are brought into contact with each other, the charging signal outputted from the case 4 is inputted to the requested-operation determination circuit 15 through the charging line 6 as depicted in FIG. 3. Tt should be noted that the charging signal outputted from the case 4 and inputted to the requested-operation determination circuit 15 is indicated by the reference sign S1 in FIG. 3.

Upon receiving an input of the charging signal S1, the requested-operation determination circuit 15 detects the voltage level of the charging signal S1 and measures the duration time of the voltage level of the charging signal S1. Then, upon detecting that the voltage level of the charging signal S1 is higher than the reference voltage and lower than the first threshold voltage as indicated at time "t1" in FIG.

4, the requested-operation determination circuit 15 determines that the one operation requested of the accessory 2 is the recovery operation.

When it is determined that the one operation requested of the accessory 2 is the recovery operation, the requested-operation determination circuit 15 outputs the system recovery signal to the signal processing circuit 30 as depicted in FIG. 3. Additionally, the requested-operation determination circuit 15 outputs the power ON signal to the regulator 11 as depicted in FIG. 3.

Further, upon receiving an input of the power ON signal, the regulator 11 supplies power to the signal processing circuit 30 as depicted in FIG. 3.

Upon receiving an input of the system recovery signal and receiving the power supplied from the regulator 11, the signal processing circuit 30 switches from the sleep state to the standby state.

When the power is supplied to the signal processing circuit 30 for a predetermined period of time after the signal processing circuit 30 switched from the sleep state to the standby state, the signal processing circuit 30 achieves recovery and becomes operative.

Figure 5:
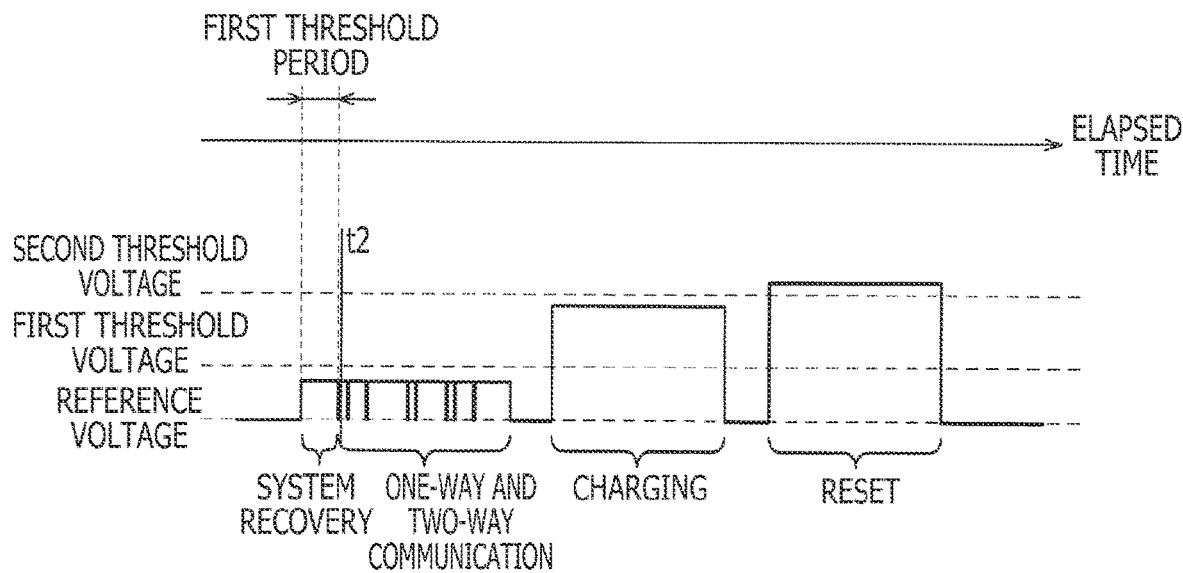
FIG. 5 is a timing diagram illustrating operations performed by the communication system.

Thereafter, when the voltage level of the charging signal S1 has remained higher than the reference voltage and lower than the first threshold voltage for the first threshold period, which ends at time "t2" as indicated in FIG. 5, the requested-operation determination circuit 15 determines that the one operation requested of the accessory 2 is the communication operation. It should be noted that the communication operation in FIG. 5 is depicted as "one-way and two-way communication."

Figure 6:
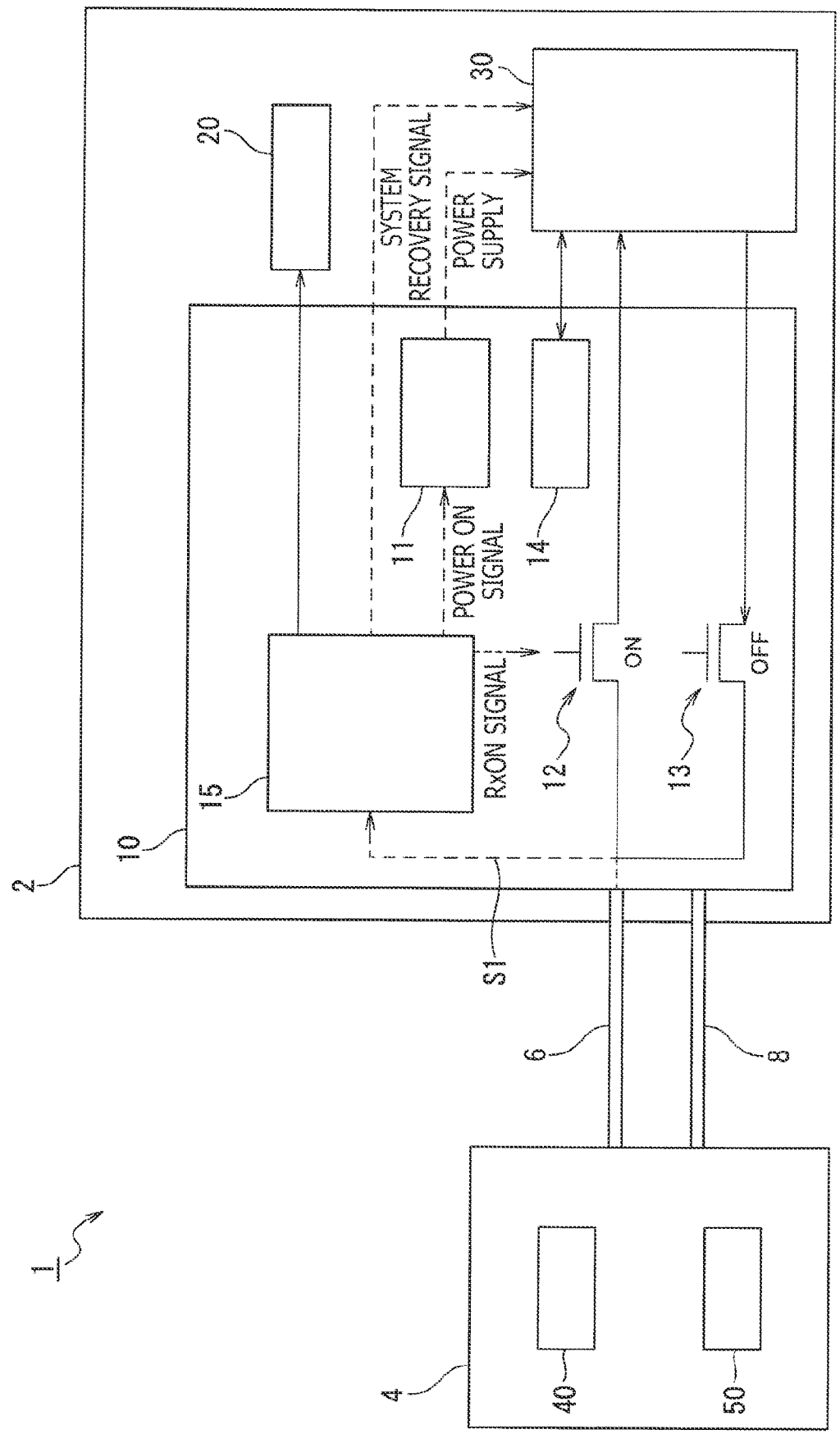
FIG. 6 is a diagram illustrating operations performed by the communication system.

When it is determined that the one operation requested of the accessory 2 is the communication operation, the requested-operation determination circuit 15 outputs the reception route connection signal (RxON signal) to the reception path 12 as depicted in FIG. 6.

Upon receiving an input of the reception route connection signal, the reception path 12 connects (turns ON) the signal transmission route from the charging terminal to the signal processing circuit 30.

Figure 7:
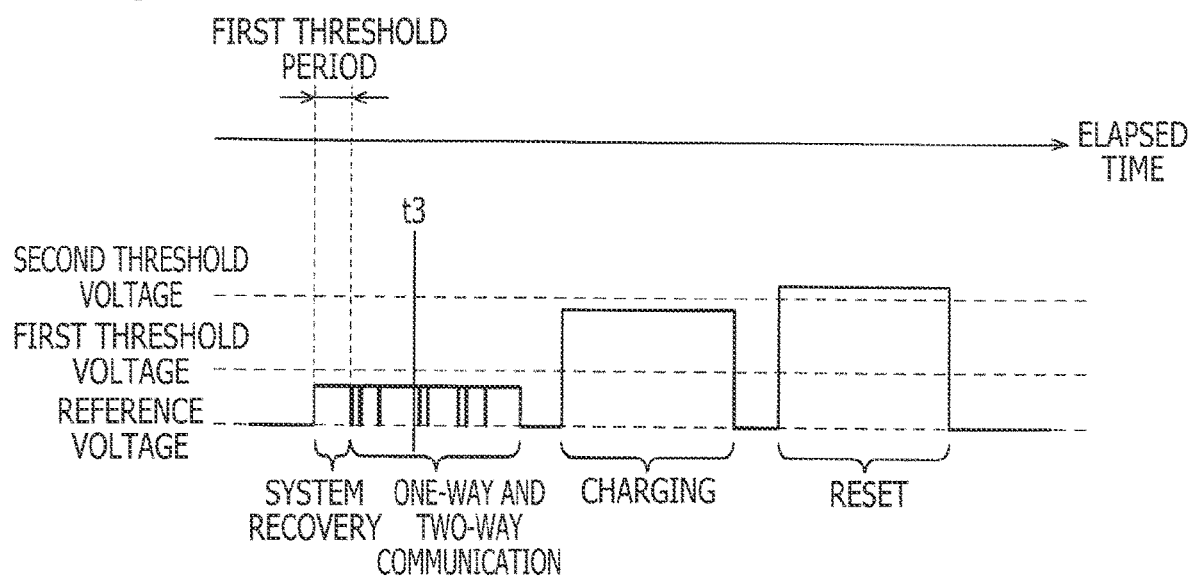
FIG. 7 is a timing diagram illustrating operations performed by the communication system.
Figure 8:
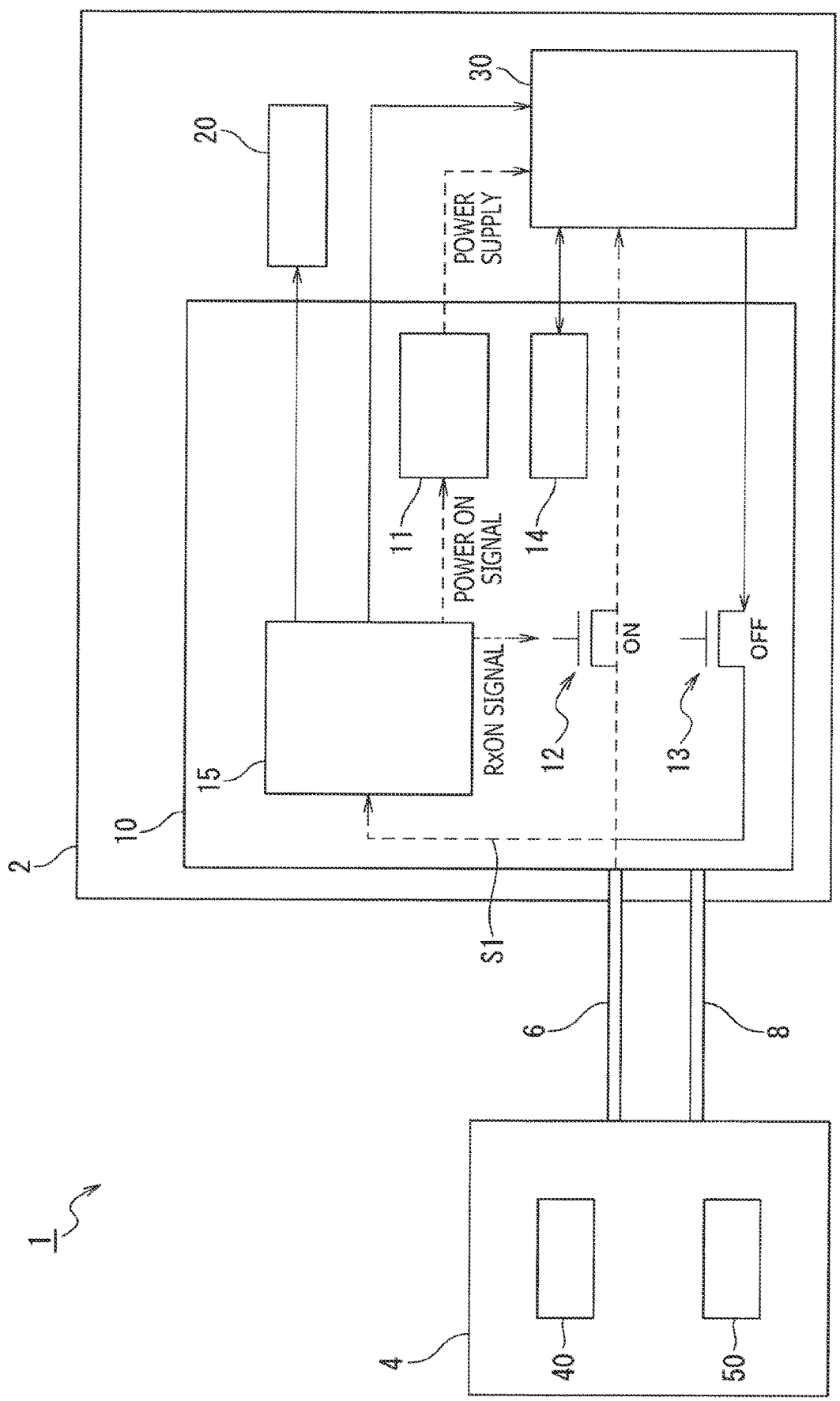
FIG. 8 is a diagram illustrating operations performed by the communication system.

When the voltage level of the charging signal S1 is higher than the reference voltage and lower than the first threshold voltage after time t2 as indicated at time "t3" in FIG. 7, the reception path 12 continuously connects the signal transmission route from the charging terminal to the signal processing circuit 30. Then, as depicted in FIG. 8, the charging signal S1 is inputted from the case 4 to the signal processing circuit 30.

Upon receiving an input of the charging signal S1, the signal processing circuit 30 performs processing based on the voltage level (e.g., an instantaneous change in the voltage level and the time of instantaneous change in the voltage level). The processing performed based on the voltage level by the signal processing circuit 30 is, for example, a process of indicating the remaining capacity (remaining battery level) of the accessory battery 20 by using a blinking or steadily glowing LED.

Figure 9:
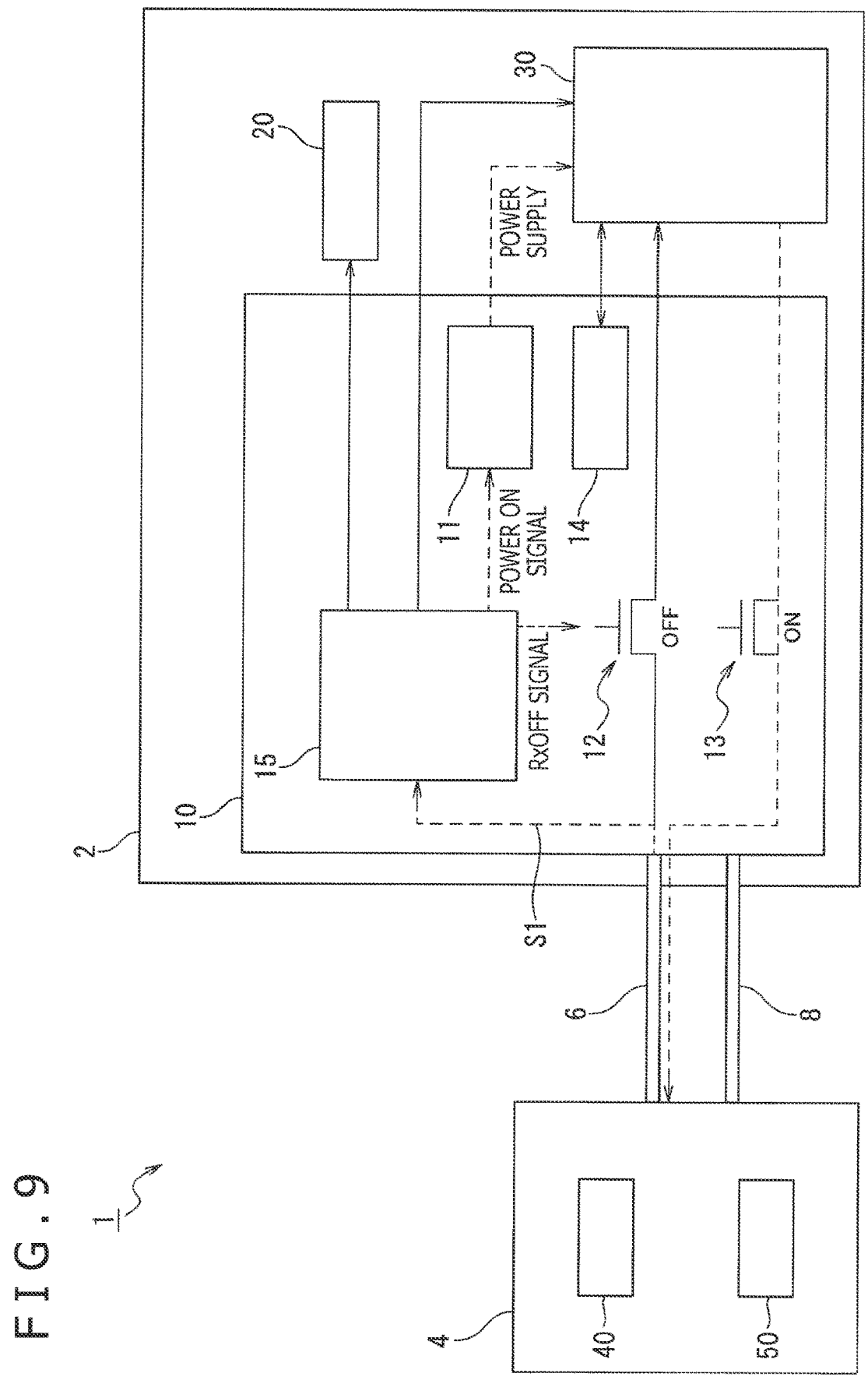
FIG. 9 is a diagram illustrating operations performed by the communication system.

Further, when the charging signal S1 is inputted to the signal processing circuit 30, the requested-operation determination circuit 15 outputs the reception route blocking signal (RxOFF signal) to the reception path 12 as depicted in FIG. 9. Upon receiving an input of the reception route blocking signal, the reception path 12 blocks (turns OFF) the signal transmission route from the charging terminal to the signal processing circuit 30.

Additionally, the requested-operation determination circuit 15 outputs a command signal to the register 14 in order to input the transmission route connection signal to the signal processing circuit 30. Upon receiving an input of the command signal, the register 14 outputs, to the signal processing circuit 30, the transmission route connection signal to be inputted to the transmission path 13. Upon receiving an input of the transmission route connection signal from the register 14, the signal processing circuit 30 outputs the transmission route connection signal to the transmission path 13.

Upon receiving an input of the transmission route connection signal, the transmission path 13 connects (turns ON) the signal transmission route from the signal processing circuit 30 to the charging terminal.

When the reception path 12 blocks the signal transmission route from the charging terminal to the signal processing circuit 30 and the transmission path 13 connects the signal transmission route from the signal processing circuit 30 to the charging terminal, the case 4 communicates with the requested-operation determination circuit 15, and the signal processing circuit 30 communicates with the case 4.

Figure 10:
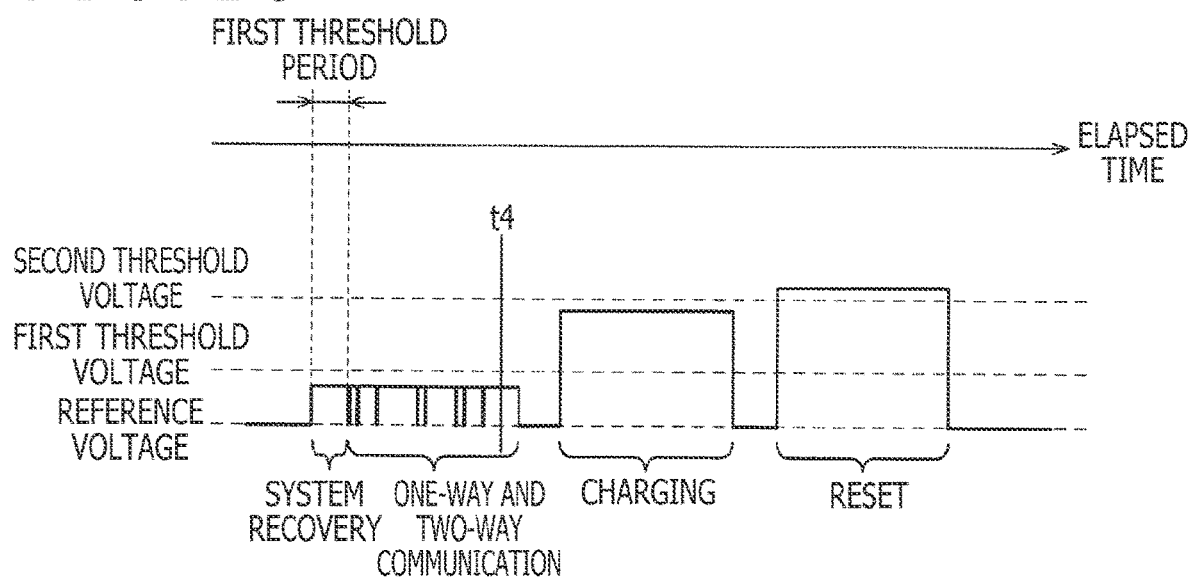
FIG. 10 is a timing diagram illustrating operations performed by the communication system.

When the voltage level of the charging signal S1 is higher than the reference voltage and lower than the first threshold voltage after time t3 as indicated at time "t4" in FIG. 10, the reception path 12 continuously blocks the signal transmission route from the charging terminal to the signal processing circuit 30. Then, when the communication signal outputted from the signal processing circuit 30 is inputted to the case 4, the requested-operation determination circuit 15 outputs a command signal to the register 14 in order to input the transmission route blocking signal to the signal processing circuit 30.

Upon receiving an input of the command signal, the register 14 outputs the transmission route blocking signal (TxOFF signal) to the transmission path 13 through the signal processing circuit 30.

Figure 11:
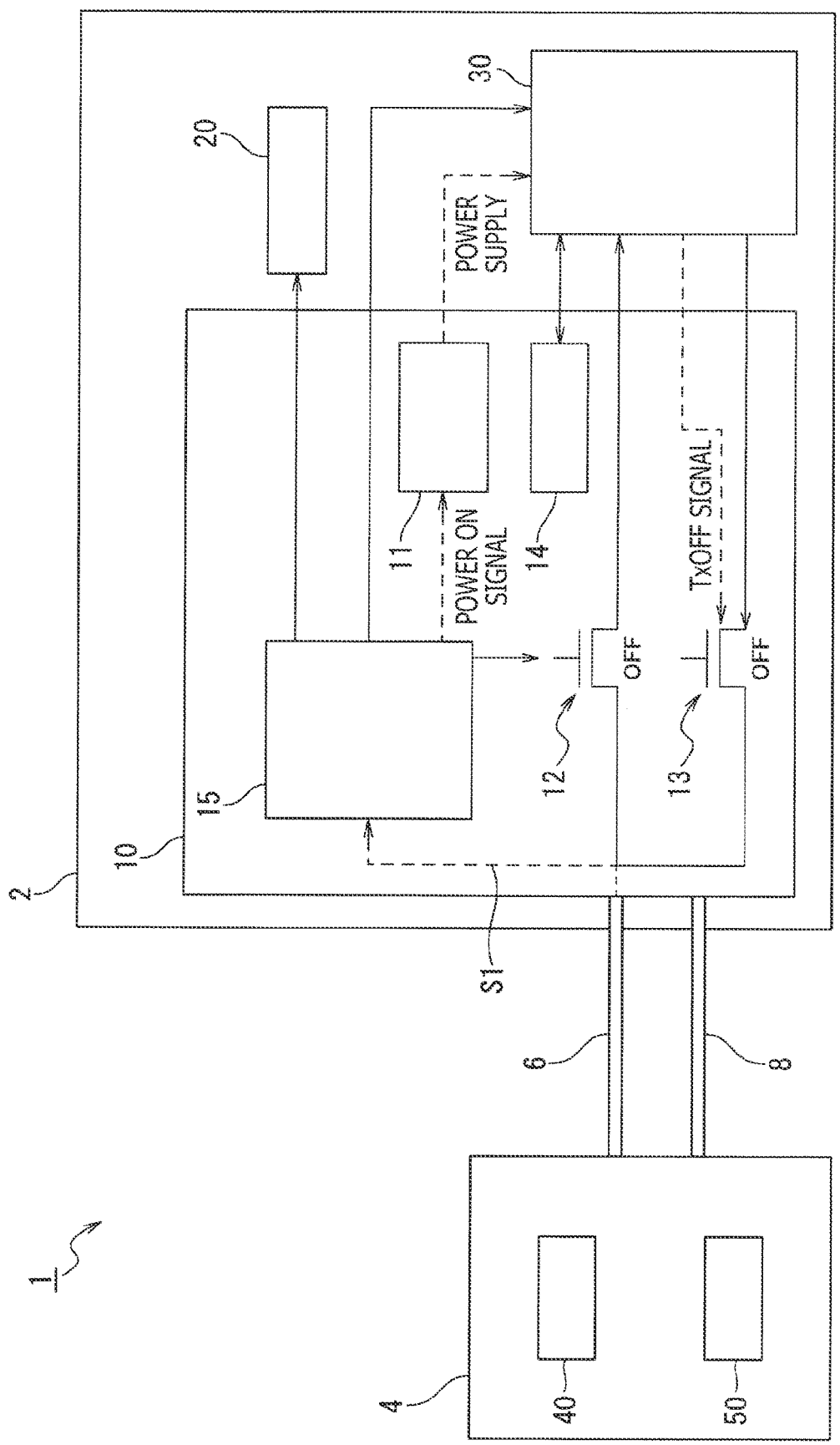
FIG. 11 is a diagram illustrating operations performed by the communication system.

Upon receiving an input of the transmission route blocking signal, the transmission path 13 blocks (turns OFF) the signal transmission route from the signal processing circuit 30 to the charging terminal as depicted in FIG. 11.

Figure 12:
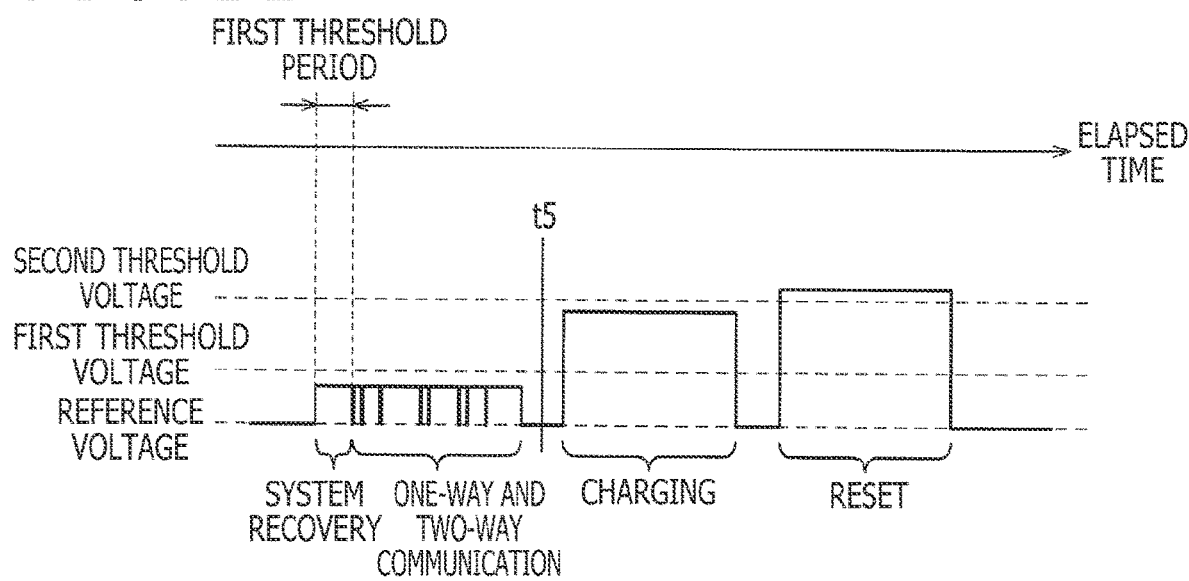
FIG. 12 is a timing diagram illustrating operations performed by the communication system.

When the voltage level of the charging signal S1 lowers to the reference voltage after time t4 as indicated at time "t5" in FIG. 12, the requested-operation determination circuit 15 determines that the one operation requested of the accessory 2 is the sleep operation.

Figure 13:
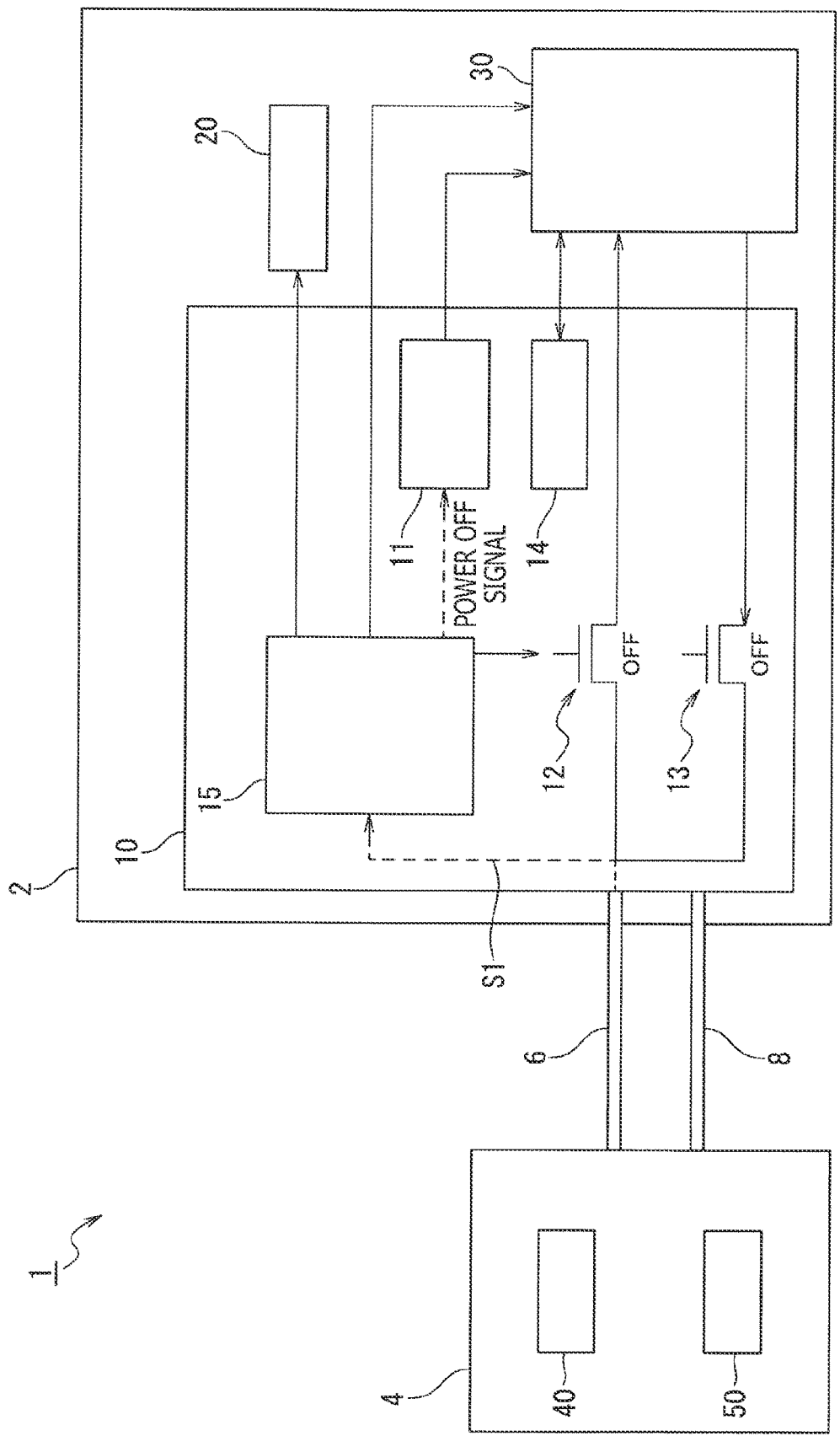
FIG. 13 is a diagram illustrating operations performed by the communication system.

When it is determined that the one operation requested of the accessory 2 is the sleep operation, the requested-operation determination circuit 15 outputs the power OFF signal to the regulator 11 as depicted in FIG. 13.

Upon receiving an input of the power OFF signal, the regulator 11 shuts off the power supply to the signal processing circuit 30 as depicted in FIG. 13.

Figure 14:
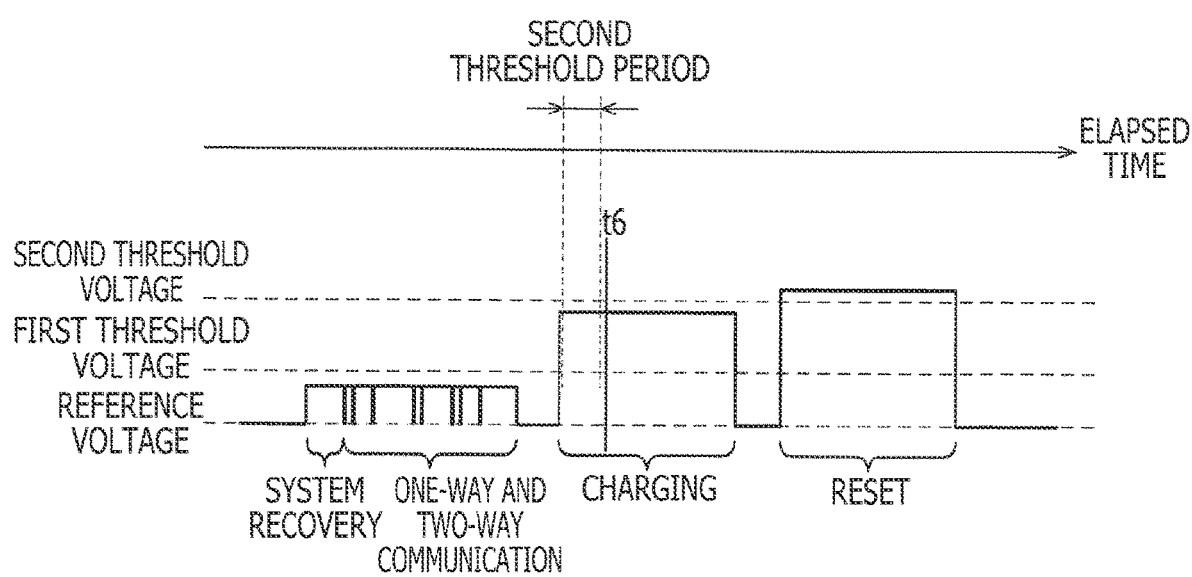
FIG. 14 is a timing diagram illustrating operations performed by the communication system.

In a case where the voltage level of the charging signal S1 has remained not lower than the first threshold voltage for the second threshold period after time t5 as indicated at time "t6" in FIG. 14, the requested-operation determination circuit 15 determines that the one operation requested of the accessory 2 is the charging operation.

Figure 15:
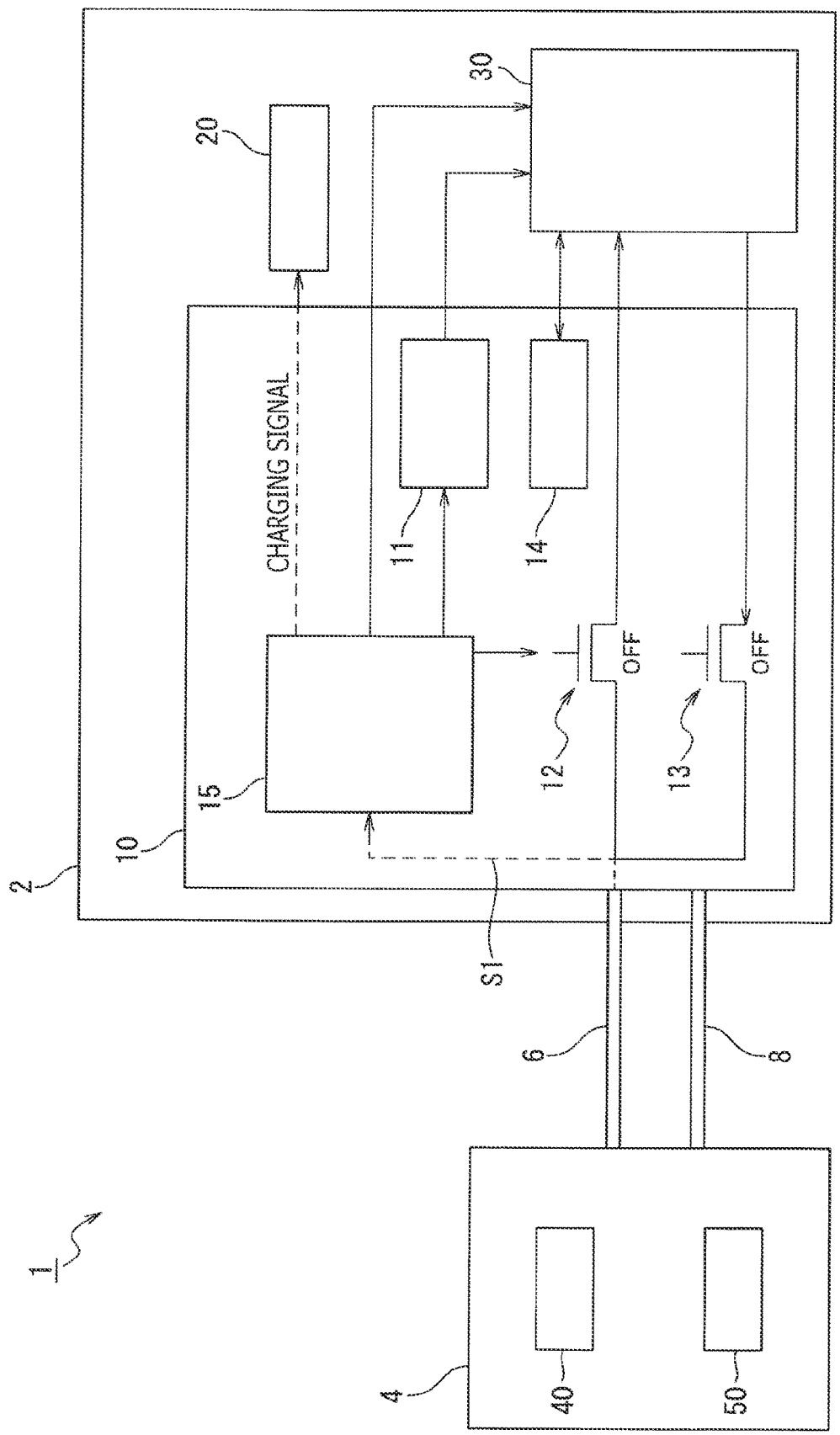
FIG. 15 is a diagram illustrating operations performed by the communication system.

When it is determined that the one operation requested of the accessory 2 is the charging operation, the requested-operation determination circuit 15 supplies the charging signal to the accessory battery 20 as depicted in FIG. 15.

Upon receiving the supplied charging signal, the accessory battery 20 is charged based on the voltage level of the charging signal.

Figure 16:
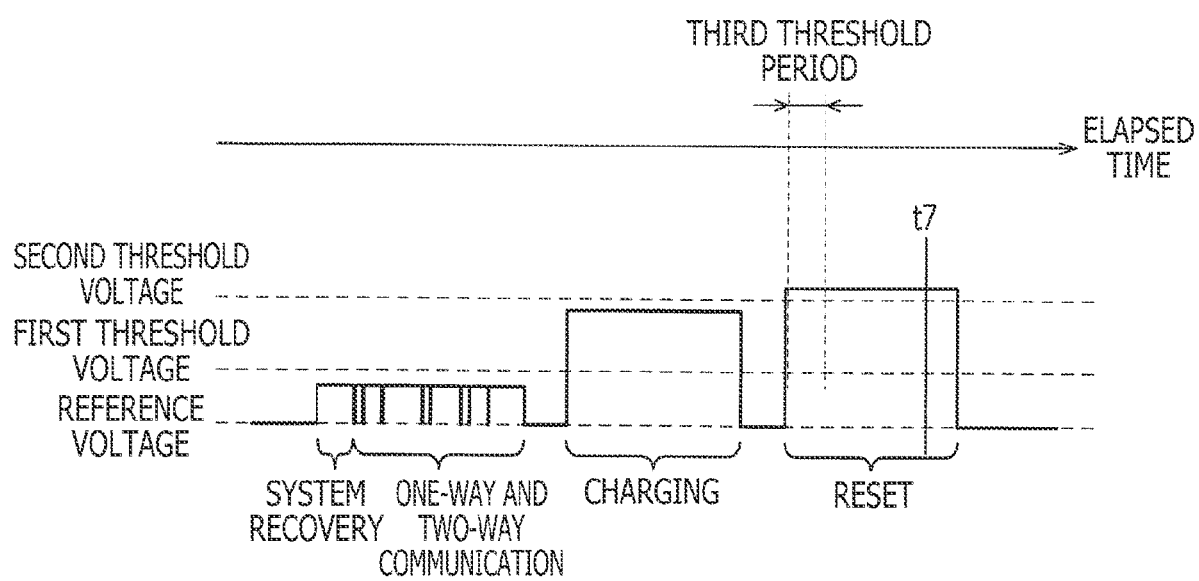
FIG. 16 is a timing diagram illustrating operations performed by the communication system.

In a case where the voltage level of the charging signal S1 has remained not lower than the second threshold voltage for the third threshold period after time t6 as indicated at time "t7" in FIG. 16, the requested-operation determination circuit 15 determines that the one operation requested of the accessory 2 is the initialization operation.

When it is determined that the one operation requested of the accessory 2 is the initialization operation, the requested-operation determination circuit 15 outputs a command signal to the regulator 11, the reception path 12, the transmission path 13, the register 14, and the signal processing circuit 30 in order to initialize their states.

As described above, the accessory 2 and the communication system 1 according to the first embodiment are able to determine the one operation requested of the accessory 2 according to the voltage level of the charging signal inputted from the case 4 and to the duration time of the voltage level. Consequently, the one operation requested of the accessory 2 can be determined without requiring a configuration including, for example, a separation circuit for signal separation. This allows the use of simplified circuitry. Further, as the configuration including, for example, the separation circuit for signal separation is not required, it is not necessary to operate, for example, the separation circuit. As a result, an increase in the amount of power consumption can be suppressed.

Further, as described earlier, an operation determination method used by the accessory 2 and the communication system 1 according to the first embodiment makes it possible to determine the one operation requested of the accessory 2 according to the voltage level of the charging signal and to the duration time of the voltage level. Consequently, the one operation requested of the accessory 2 can be determined without requiring the configuration including, for example, the separation circuit for signal separation. This allows the use of simplified circuitry. Further, as the configuration including, for example, the separation circuit for signal separation is not required, it is not necessary to operate, for example, the separation circuit. As a result, an increase in the amount of power consumption can be suppressed.

Modifications

The first embodiment assumes that the accessory 2 is a pair of wireless earphones. However, the accessory 2 is not limited to wireless earphones. Alternatively, the accessory 2 may be, for example, a wireless microphone for recording sounds or a pair of VR (Virtual Reality) goggles for outputting video images. Further, the accessory 2 may be, for example, a clock or a sensor for detecting biological information (pulse, heart rate, blood pressure, etc.).

Second Embodiment

A second embodiment will be described below. However, components similar to those in the first embodiment may not be redundantly described.

Figure 17:
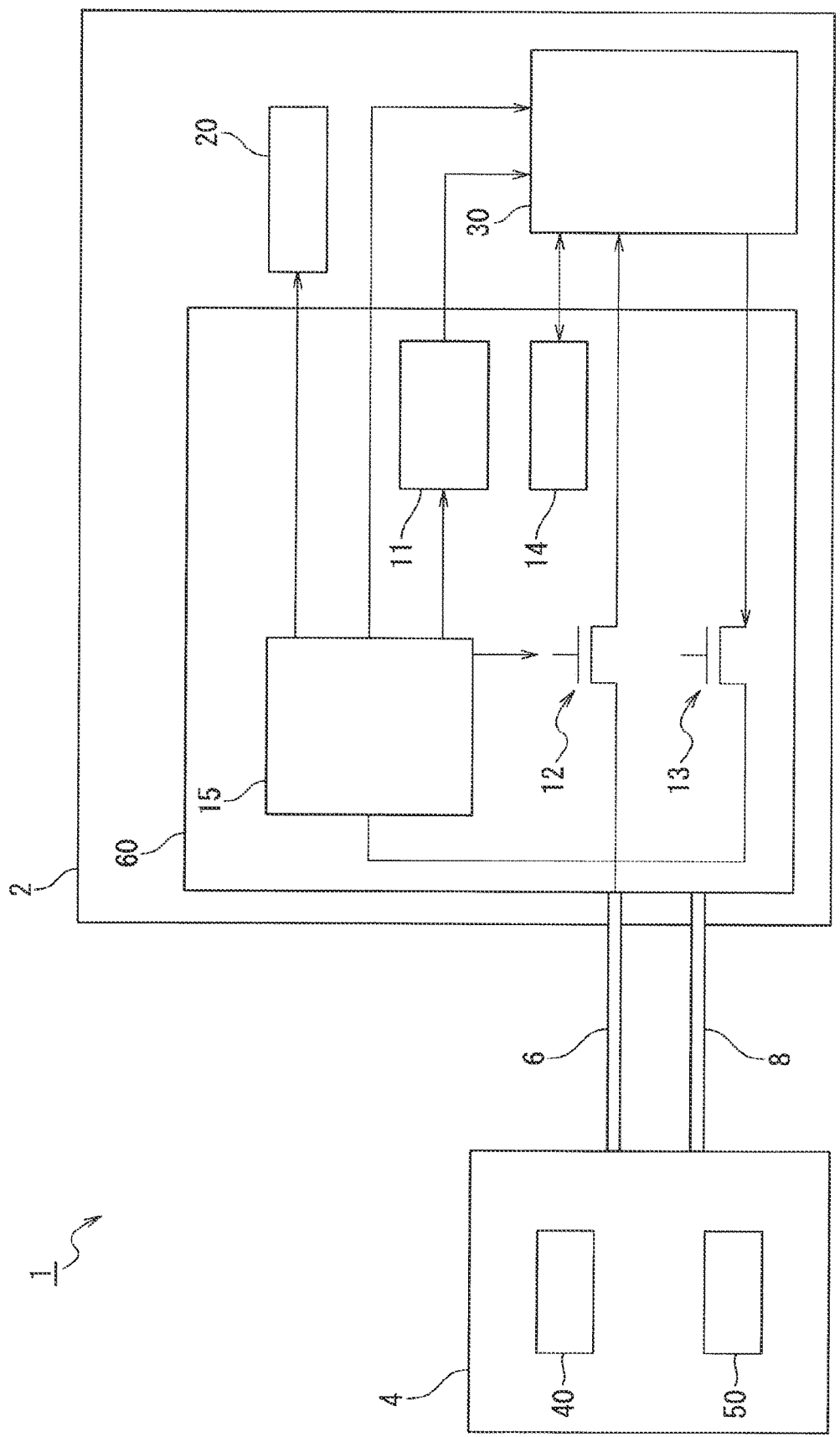
FIG. 17 is a diagram illustrating a configuration of a communication system according to a second embodiment.

As depicted in FIG. 17, a communication system 1 according to the second embodiment includes an accessory 2, a case 4, and a power management IC 60.

Configuration of Accessory

The accessory 2 includes an accessory battery 20 and a signal processing circuit 30.

The accessory battery 20 is, for example, a rechargeable lithium-ion battery. The charging signal is supplied to the accessory battery 20 through a requested-operation determination circuit 15. Further, the accessory battery 20 supplies power to the power management IC 60 and the signal processing circuit 30. It should be noted that the power management IC 60 is able to selectively use either power supplied from the accessory battery 20 or power supplied from the case 4 by the charging signal. Therefore, in a case, for example, where the accessory battery 20 is dead, the power management IC 60 is able to operate on the power supplied from the case 4 by the charging signal. Further, even in a state where the accessory battery 20 is not to be charged, the power management IC 60 is able to operate on the power supplied from the case 4 by the charging signal.

The configuration of the signal processing circuit 30 is similar to that of the signal processing circuit 30 in the first embodiment, which has been described earlier, and will not be redundantly described.

Configuration of Power Management IC

The power management IC 60 is included in the accessory 2, and connected to the case 4 with a charging line 6 and a GND line 8.

Further, the power management IC 60 includes a regulator 11, a reception path 12, a transmission path 13, a register 14, and the requested-operation determination circuit 15.

Upon receiving a command signal inputted from the requested-operation determination circuit 15, the regulator 11 outputs the command signal to the signal processing circuit 30. Further, the regulator 11 includes a DC-DC converter and an LDO.

The reception path 12 is connected to the signal processing circuit 30 and to a charging terminal that is connected to the charging line 6. Further, when the reception route connection signal is inputted from the requested-operation determination circuit 15, the reception path 12 connects a signal transmission route tram the charging terminal to the signal processing circuit 30. Further, when the reception route blocking signal is inputted from the requested-operation determination circuit 15, the reception path 12 blocks the signal transmission route from the charging terminal to the signal processing circuit 30.

The transmission path 13 is connected to the charging terminal and the signal processing circuit 30. The transmission path 13 and the signal processing circuit 30 are connected by using, for example, a UART. Further, when the transmission route connection signal is inputted from the signal processing circuit 30, the transmission path 13 connects the signal transmission route from the signal processing circuit 30 to the charging terminal. Further, when the transmission route blocking signal is inputted from the signal processing circuit 30, the transmission path 13 blocks the signal transmission route from the signal processing circuit 30 to the charging terminal.

The register 14 is connected to the signal processing circuit 30 by using, for example, an I2C.

Further, based on the command signal inputted from the requested-operation determination circuit 15, the register 14 inputs, to the signal processing circuit 30, the transmission route connection signal or the transmission route blocking signal to be inputted to the transmission path 13.

Based on the voltage level of the charging signal inputted from the case 4 through the charging line 6 and on the duration time of the voltage level of the charging signal, the requested-operation determination circuit 15 determines (identifies) one operation requested of the accessory 2.

Operations that can be requested of the accessory 2 and processes (I) to (V) that are performed by the requested-operation determination circuit 15 to determine the one operation requested of the accessory 2 are similar to those described in conjunction with the first embodiment and will not be redundantly described.

Configuration of Case

The case 4 functions as a docking station capable of docking the accessory 2. Further, the case 4 includes a case battery 40 and a signal control section 50.

The case battery 40, which is, for example, a rechargeable lithium-ion battery, outputs the charging signal to the power management IC 60 through the charging line 6. Therefore, the case 4 is able to supply power to the power management IC 60.

The signal control section 50 controls the voltage level or the charging signal to be outputted to the power management IC 60 through the charging line 6 and the duration time of the voltage level. Control exercised over the charging signal by the signal control section 50 is based on the one operation requested of the accessory 2.

Operations and Effects

Referring to FIGS. 1 to 16 and based on FIG. 17, operations performed by the communication system 1 and effects produced by the operations performed by the communication system 1 will now be described. The following description assumes that the case 4 and the accessory 2 are not connected, and that the signal processing circuit 30 is in the sleep state, and further that the signal transmission route from the charging terminal to the signal processing circuit 30 and the signal transmission route from the signal processing circuit 30 to the charging terminal are blocked.

In a case where, for example, the remaining power of the accessory battery 20 is low during the use of the accessory 2, the accessory 2 and the case 4 are connected in order, for example, to charge the accessory battery 20.

When the accessory 2 and the case 4 are connected, the charging signal outputted from the case 4 is inputted to the requested-operation determination circuit 15 through the charging line 6. Upon receiving an input of the charging signal, the requested-operation determination circuit 15 detects the voltage level of the charging signal and measures the duration time of the voltage level of the charging signal. Then, upon detecting that the voltage level of the charging signal is higher than the reference voltage and lower than the first threshold voltage, the requested-operation determination circuit 15 determines that the one operation requested of the accessory 2 is the recovery operation.

When it is determined that the one operation requested of the accessory 2 is the recovery operation, the requested-operation determination circuit 15 outputs a system recovery signal to the signal processing circuit 30. Additionally, the requested-operation determination circuit 15 outputs a power ON signal to the regulator 11.

Further, upon receiving an input of the power ON signal, the regulator 11 supplies power to the signal processing circuit 30. Upon receiving an input of the system recovery signal and receiving the power supplied from the regulator 11, the signal processing circuit 30 switches from the sleep state to the standby state. When the power is supplied to the signal processing circuit 30 for a predetermined period of time after the signal processing circuit 30 switched from the sleep state to the standby state, the signal processing circuit 30 achieves recovery and becomes operative.

Thereafter, when the voltage level of the charging signal has remained higher than the reference voltage and lower than the first threshold voltage for the first threshold period, the requested-operation determination circuit 15 determines that the one operation requested of the accessory 2 is the communication operation.

When it is determined that the one operation requested of the accessory 2 is the communication operation, the requested-operation determination circuit 15 outputs the reception route connection signal to the reception path 12. Upon receiving an input of the reception route connection signal, the reception path 12 connects the signal transmission route from the charging terminal to the signal processing circuit 30.

When the voltage level of the charging signal is higher than the reference voltage and lower than the first threshold voltage, the reception path 12 continuously connects the signal transmission route from the charging terminal to the signal processing circuit 30. Upon receiving an input of the charging signal, the signal processing circuit 30 performs processing based on the voltage level.

Further, when the charging signal is inputted to the signal processing circuit 30, the requested-operation determination circuit 15 outputs the reception route blocking signal to the reception path 12. Upon receiving an input of the reception route blocking signal, the reception path 12 blocks the signal transmission route from the charging terminal to the signal processing circuit 30. Additionally, the requested-operation determination circuit 15 outputs a command signal to the register 14 in order to input the transmission route connection signal to the signal processing circuit 30. Upon receiving an input of the command signal, the register 14 outputs, to the signal processing circuit 30, the transmission route connection signal to be inputted to the transmission path 13. Upon receiving an input of the transmission route connection signal from the register 14, the signal processing circuit 30 outputs the transmission route connection signal to the transmission path 13. Upon receiving an input of the transmission route connection signal, the transmission path 13 connects the signal transmission route from the signal processing circuit 30 to the charging terminal.

When the reception path 12 blocks the signal transmission route from the charging terminal to the signal processing circuit 30 and the transmission path 13 connects the signal transmission route from the signal processing circuit 30 to the charging terminal, the case 4 communicates with the requested-operation determination circuit 15, and the signal processing circuit 30 communicates with the case 4.

When the voltage level of the charging signal is higher than the reference voltage and lower than the first threshold voltage, the reception path 12 continuously blocks the signal transmission route from the charging terminal to the signal processing circuit 30. Then, when the communication signal outputted from the signal processing circuit 30 is inputted to the case 4, the requested-operation determination circuit 15 outputs a command signal to the register 14 in order to input the transmission route blocking signal to the signal processing circuit 30.

Upon receiving an input of the command signal, the register 14 outputs the transmission route blocking signal to the transmission path 13 through the signal processing circuit 30. Upon receiving an input of the transmission route blocking signal, the transmission path 13 blocks the signal transmission route from the signal processing circuit 30 to the charging terminal.

When the voltage level of the charging signal lowers to the reference voltage, the requested-operation determination circuit 15 determines that the one operation requested of the accessory 2 is the sleep operation.

When it is determined that the one operation requested of the accessory 2 is the sleep operation, the requested-operation determination circuit 15 outputs the power OFF signal to the regulator 11. Upon receiving an input of the power OFF signal, the regulator 11 shuts off the power supply to the signal processing circuit 30.

When the voltage level of the charging signal has remained not lower than the first threshold voltage for the second threshold period, the requested-operation determination circuit 15 determines that the one operation requested of the accessory 2 is the charging operation.

When it is determined that the one operation requested of the accessory 2 is the charging operation, the requested-operation determination circuit 15 supplies the charging signal to the accessory battery 20. Upon receiving the supplied charging signal, the accessory battery 20 is charged based on the voltage level of the charging signal.

When the voltage level of the charging signal has remained not lower than the second threshold voltage for the third threshold period, the requested-operation determination circuit 15 determines that the one operation requested of the accessory 2 is the initialization operation.

When it is determined that the one operation requested of the accessory 2 is the initialization operation, the requested-operation determination circuit 15 outputs a command signal to the regulator 11, the reception path 12, the transmission path 13, the register 14, and the signal processing circuit 30 in order to initialize their states.

As described above, the power management IC 60 and the communication system 1 according to the second embodiment are able to determine the one operation requested of the accessory 2 according to the voltage level of the charging signal inputted from the case 4 and to the duration time of the voltage level. Consequently, the one operation requested of the accessory 2 can be determined without requiring a configuration including, for example, a separation circuit for signal separation. This allows the use of simplified circuitry. Further, as the configuration including, for example, the separation circuit for signal separation is not required, it is not necessary to operate, for example, the separation circuit. As a result, an increase is the amount of power consumption can be suppressed.

Further, as described earlier, an operation determination method used by the power management IC 60 and the communication system 1 according to the second embodiment makes it possible to determine the one operation requested of the accessory 2 according to the voltage level of the charging signal and to the duration time of the voltage level. Consequently, the one operation requested of the accessory 2 can be determined without requiring the configuration including, for example, the separation circuit for signal separation. This allows the use of simplified circuitry. Further, as the configuration including, for example, the separation circuit for signal separation is not required, it is not necessary to operate, for example, the separation circuit. As a result, an increase in the amount of power consumption can be suppressed.

Modifications

The second embodiment assumes that the accessory 2 and the case 4 are connected with the charging line 6 and the GND line 8. However, the form of connection between the accessory 2 and the case 4 is not limited to such a configuration. More specifically, as depicted, for example, in FIG. 18, a switch 70 may be externally attached to the middle of the charging line 6. The switch 70 branches the charging line 6 into two lines for connecting to the accessory 2.

When the voltage level of the charging signal is higher than the reference voltage and lower than the first threshold voltage, the switch 70 inputs the charging signal to the first determination section 15*a* (see FIG. 2). Meanwhile, when the voltage level of the charging signal is higher than the first threshold voltage, the switch 70 inputs the charging signal to the third determination section 15*e* (see FIG. 2).

Figure 18:
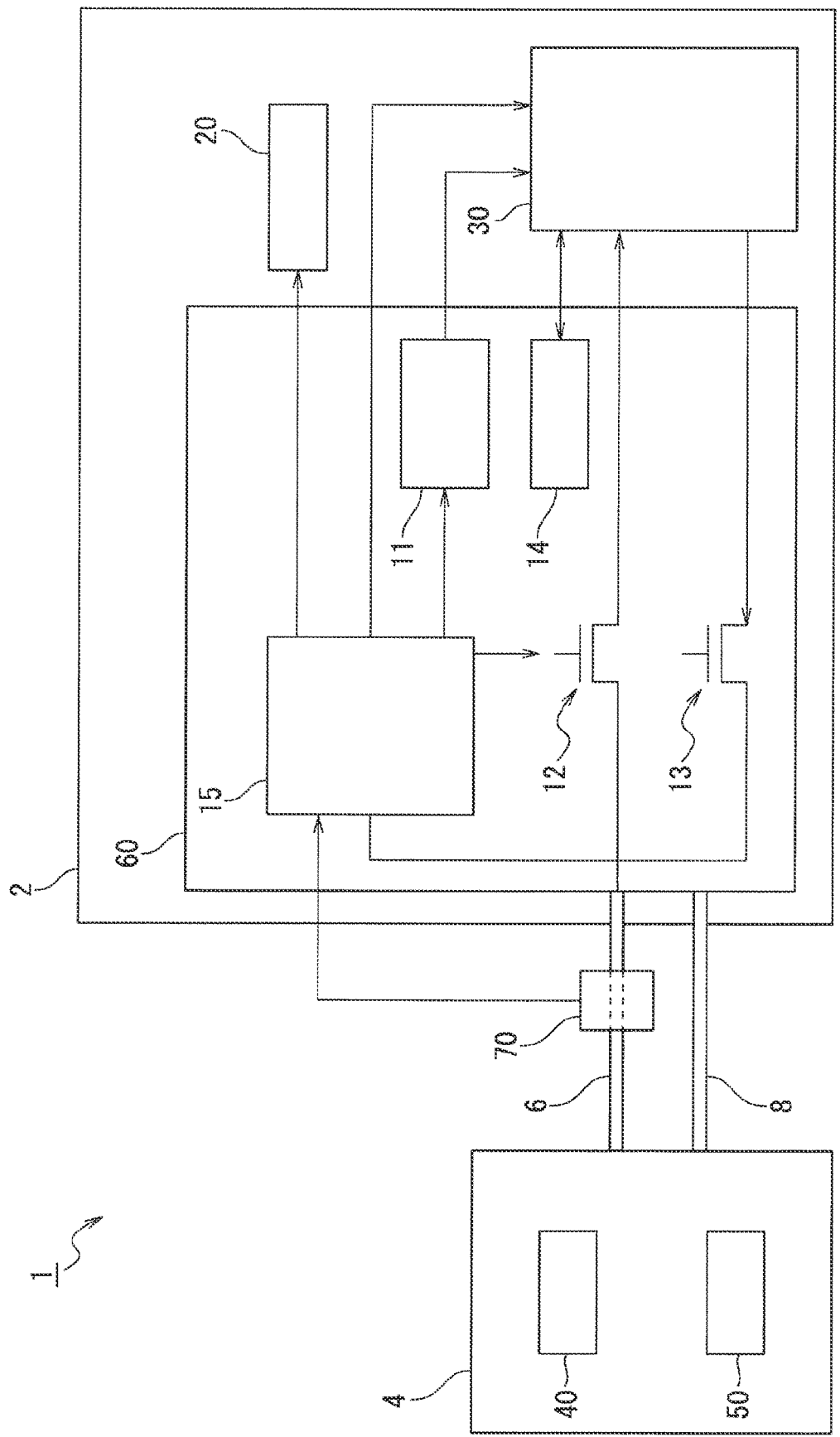
FIG. 18 is a diagram illustrating a modification of the second embodiment.

When the configuration depicted in FIG. 18 is adopted, the second determination section 15*c* and the second counter processing section 15*d* may be removed from the requested-operation determination circuit 15. This makes it possible to simplify the configuration of the requested-operation determination circuit 15.

Other Embodiments

While the embodiments of the present technology have bees described above, it is to be understood that the present technology is not limited by the statements and drawings included in the present disclosure. It will be obvious from the present disclosure that various alternative embodiments, examples, and operational technologies may be contemplated by those skilled in the art. Further, it is apparent that the present technology also includes, for example, configurations formed as appropriate by using individual components described is conjunction with the foregoing embodiments and modifications and various embodiments other than those described in this specification. Therefore, the technical scope of the present technology is defined only by matters specifying the claimed invention within the scope of the appended claims appropriate based on the above explanation.

Further, the accessory, the power management IC, and the communication system according to the present disclosure do not need to include all the components described in conjunction with the foregoing embodiments, and may conversely include some other components. It should be noted that advantages described in this specification are merely illustrative and not restrictive. The present technology can additionally provide advantages other than those described in this specification.

It should be noted that the present technology may adopt the following configurations.

(1)
An accessory that is connectable to a case with a charging line and a GND line, the charging line transmitting and receiving a charging signal, the GND line being set to a reference voltage, the accessory including:
a requested-operation determination circuit that, based on a voltage level of the charging signal and on a duration time of the voltage level, determines one operation requested of the accessory.

(2)
The accessory as described in (1) above, further including:
an accessory battery that is chargeable by the charging signal; and
a signal processing circuit that is able to process the charging signal inputted from the case and switch into a sleep state,
in which operations that are capable of being requested of the accessory include an initialization operation, a charging operation, and a communication operation, the initialization operation initializing a system of the accessory, the charging operation charging the accessory battery, the communication operation providing one-way communication from the case to the requested-operation determination circuit and two-way communication between the signal processing circuit and the case, when the voltage level has remained higher than the reference voltage and lower than a preset first threshold voltage for a preset first threshold period, the requested-operation determination circuit determines that the one operation is the communication operation, when the voltage level has remained not lower than the first threshold voltage for a preset second threshold period, the requested-operation determination circuit determines that the one operation is the charging operation, and, when the voltage level has remained not lower than a second threshold voltage for a preset third threshold period, the requested-operation determination circuit determines that the one operation is the initialization operation, the second threshold voltage being set higher than the first threshold voltage.

(3)
The accessory as described in (2) above,
in which operations that are capable of being requested of the accessory include a recovery operation, the recovery operation recovering the signal processing circuit from the sleep state, and,
upon detecting that the voltage level is higher than the reference voltage and lower than the preset first threshold voltage, the requested-operation determination circuit determines that the one operation is the recovery operation.

(4)
The accessory as described in (2) or (3) above,
in which operations that are capable of being requested of the accessory include a sleep operation, the sleep operation switching the running signal processing circuit into the sleep state, and,
when the voltage level higher than the reference voltage lowers to the reference voltage, the requested-operation determination circuit determines that the requested operation is the sleep operation.

(5)
A power management IC that is included in an accessory and connected to a case with a charging line and a GND line, the accessory operating on electric power, the case being capable of supplying the electric power, the charging line transmitting and receiving a charging signal, the GNP line being set to a reference voltage, the power management IC including:
a requested-operation determination circuit that, based on a voltage level of the charging signal and on a duration time of the voltage level, determines one operation requested of the accessory.

(6)
The power management IEC as described in (5) above,
in which the accessory includes an accessory battery and a signal processing circuit, the accessory battery being chargeable by the charging signal, the signal processing circuit being able to process the charging signal inputted from the case and switch into a sleep state,
operations that are capable of being requested of the accessory include an initialization operation, a charging operation, and a communication operation, the initialization operation initializing a system of the accessory, the charging operation charging the accessory battery, the communication operation providing one-way communication from the case to the requested-operation determination circuit and two-way communication between the signal processing circuit and the case, when the voltage level has remained higher than the reference voltage and lower than a preset first threshold voltage for a preset first threshold period, the requested-operation determination circuit determines that the one operation is the communication operation, when the voltage level has remained not lower than the first threshold voltage for a preset second threshold period, the requested-operation determination circuit determines that the one operation is the charging operation, and, when the voltage level has remained not lower than a second threshold voltage for a preset third threshold period, the requested-operation determination circuit determines that the one operation is the initialization operation, the second threshold voltage being set higher than the first threshold voltage.

(7)
The power management IC as described in (6) above,
in which operations that are capable of being requested of the accessory include a recovery operation, the recovery operation recovering the signal processing circuit from the sleep state, and,
upon detecting that the voltage level is higher than the reference voltage and lower than the preset first threshold voltage, the requested-operation determination circuit determines that the one operation is the recovery operation.

(8)
The power management IC as described in (6) or (7) above,
in which operations that are capable of being requested of the accessory include a sleep operation, the sleep operation switching the running signal processing circuit into the sleep state, and,
when the voltage level higher than the reference voltage lowers to the reference voltage, the requested-operation determination circuit determines that the requested operation is the sleep operation.

(9)
A communication system including:
a case that is capable of supplying electric power; and
an accessory that is connectable to the case with a charging line and a GND line, the charging line transmitting and receiving a charging signal, the GND line being set to a reference voltage,
in which the accessory includes a requested-operation determination circuit that, based on a voltage level of the charging signal and on a duration time of the voltage level, determines one operation requested of the accessory.

(10)
The communication system as described in (9) above,
in which the accessory includes an accessory battery and a signal processing circuit, the accessory battery being chargeable by the charging signal, the signal processing circuit being able to process the charging signal inputted from the case and switch into a sleep state, operations that are capable of being requested of the accessory include an initialization operation, a charging operation, and a communication operation, the initialization operation initializing a system of the accessory, the charging operation charging the accessory battery, the communication operation providing one-way communication from the case to the requested-operation determination circuit and two-way communication between the signal processing circuit and the case, when the voltage level has remained higher than the reference voltage and lower than a preset first threshold voltage for a preset first threshold period, the requested-operation determination circuit determines that the one operation is the communication operation, when the voltage level has remained not lower than the first threshold voltage for a preset second threshold period, the requested-operation determination circuit determines that the one operation is the charging operation, and, when the voltage level has remained not lower than a second threshold voltage for a preset third threshold period, the requested-operation determination circuit determines that the one operation is the initialization operation, the second threshold voltage being set higher than the first threshold voltage.

(11)
The communication system as described in (10) above, in which operations that are capable of being requested of the accessory include a recovery operation, the recovery operation recovering the signal processing circuit from the sleep state, and, upon detecting that the voltage level is higher than the reference voltage and lower than the preset first threshold voltage, the requested-operation determination circuit determines that the one operation is the recovery operation.

(12)
The communication system as described in (10) or (11) above, in which operations that are capable of being requested of the accessory include a sleep operation, the sleep operation switching the running signal processing circuit into the sleep state, and, when the voltage level higher than the reference voltage lowers to the reference voltage, the requested-operation determination circuit determines that the requested operation is the sleep operation.

(13)
A communication system including:
a case that is capable of supplying electric power;
an accessory that operates on electric power; and
a power management IC that is included in the accessory and connected to the case with a charging line and a GND line, the charging line transmitting and receiving a charging signal, the GND line being set to a reference voltage, in which the power management IC includes a requested-operation determination circuit that, based on a voltage level of the charging signal and on a duration time of the voltage level, determines one operation requested of the accessory.

(14)
The communication system as described in (13) above, in which the accessory includes an accessory battery and a signal processing circuit, the accessory battery being chargeable by the charging signal, the signal processing circuit being able to process the charging signal inputted from the case and switch into a sleep state, operations that are capable of being requested of the accessory include an initialization operation, a charging operation, and a communication operation, the initialization operation initializing a system of the accessory, the charging operation charging the accessory battery, the communication operation providing one-way communication from the case to the requested-operation determination circuit and two-way communication between the signal processing circuit and the case, when the voltage level has remained higher than the reference voltage and lower than a preset first threshold voltage for a preset first threshold period, the requested-operation determination circuit determines that the one operation is the communication operation, when the voltage level has remained not lower than the first threshold voltage for a preset second threshold period, the requested-operation determination circuit determines that the one operation is the charging operation, and, when the voltage level has remained not lower than a second threshold voltage for a preset third threshold period, the requested-operation determination circuit determines that the one operation is the initialization operation, the second threshold voltage being set higher than the first threshold voltage.

(15)
The communication system as described in (14) above, in which operations that are capable of being requested of the accessory include a recovery operation, the recovery operation recovering the signal processing circuit from the sleep state, and, upon detecting that the voltage level is higher than the reference voltage and lower than the preset first threshold voltage, the requested-operation determination circuit determines that the one operation is the recovery operation.

(16)
The communication system as described in (14) or (15) above, in which operations that are capable of being requested of the accessory include a sleep operation, the sleep operation switching the running signal processing circuit into the sleep state, and, when the voltage level higher than the reference voltage lowers to the reference voltage, the requested-operation determination circuit determines that the requested operation is the sleep operation.

(17)
An operation determination method that determines one operation requested of an accessory, the accessory being connectable to a case with a charging line and a GND line, the charging line transmitting and receiving a charging signal, the GND line being set to a reference voltage, the operation determination method including:

based on a voltage level of the charging signal and on a duration time of the voltage level, determining the one operation.

(18)

The operation determination method as described in (17) above, in which the accessory includes an accessory battery and a signal processing circuit, the accessory battery being chargeable by the charging signal, the signal processing circuit being able to process the charging signal inputted from the case and switch into a sleep state, operations that are capable of being requested of the accessory include an initialization operation, a charging operation, and a communication operation, the initialization operation initializing a system of the accessory, the charging operation charging the accessory battery, the communication operation providing one-way communication from the case to the requested operation determination circuit and two-way communication between the signal processing circuit and the case, when the voltage level has remained higher than the reference voltage and lower than a preset first threshold voltage for a preset first threshold period, the operation determination method determines that the one operation is the communication operation, when the voltage level has remained not lower than the first threshold voltage for a preset second threshold period, the operation determination method determines that the one operation is the charging operation, and, when the voltage level has remained not lower than a second threshold voltage for a preset third threshold period, the operation determination method determines that the one operation is the initialization operation, the second threshold voltage being set higher than the first threshold voltage.

(19)

The operation determination method as described in (18) above, in which operations are capable of being requested of the accessory include a recovery operation, the recovery operation recovering the signal processing circuit from the sleep state, upon detecting that the voltage level is higher than the reference voltage and lower than the preset first threshold voltage, the operation determination method determines that the one operation is the recovery operation.

(20)

The operation determination method as described in (18) or (19) above, in which operations that are capable of being requested of the accessory include a sleep operation, the sleep operation switching the running signal processing circuit into the sleep state, when the voltage level higher than the reference voltage lowers to the reference voltage, the operation determination method determines that the requested operation is the sleep operation.

REFERENCE SIGNS LIST

1: Communication system
2: Accessory
4: Case
6: Charging line
8: CND line
10: Power management unit (PMU)
11: Regulator
12: Reception path
13: Transmission path
14: Register
15: Requested-operation determination circuit
15a: First determination section
15b: First counter processing section
15c: Second determination section
15d: Second counter processing section
15e: Third determination section
15f: Third counter processing section
20: Accessory battery
30: Signal processing circuit
40: Case battery
50: Signal control section
60: Power management IC
70: Switch

The invention claimed is:

1. An accessory that is connectable to a case with a charging line and a GND line, the charging line transmitting and receiving a charging signal, the GND line being set to a reference voltage, the accessory comprising:

a memory storing to a preset first threshold voltage, a preset second threshold voltage, a preset first threshold period, a preset second threshold period, and a preset third threshold period; and a requested-operation determination circuit that, based on a voltage level of the charging signal relative to the preset first threshold voltage and the preset second threshold voltage and based on a duration time of the voltage level relative to the preset first threshold period, the preset second threshold period, and the preset third threshold period, determines one operation requested of the accessory, the one operation being one of a plurality of operations.

2. The accessory according to claim 1, further comprising:

an accessory battery that is chargeable by the charging signal; and a signal processing circuit that is able to process the charging signal inputted from the case and switch into a sleep state, wherein the plurality of operations include an initialization operation, a charging operation, and a communication operation, the initialization operation initializing a system of the accessory, the charging operation charging the accessory battery, the communication operation providing one-way communication from the case to the requested-operation determination circuit and two-way communication between the signal processing circuit and the case, when the voltage level has remained higher than the reference voltage and lower then the preset first threshold voltage for the preset first threshold period, the requested-operation determination circuit determines that the one operation is the communication operation, when the voltage level has remained not lower than the preset first threshold voltage for the preset second threshold period, the requested-operation determination circuit determines that the one operation is the charging operation, and, when the voltage level has remained not lower the preset second threshold voltage for the preset third threshold period, the requested-operation determination circuit determines that the one operation is the initialization operation, the preset second threshold voltage being set higher than the preset first threshold voltage.

3. The accessory according to claim 2,
wherein the plurality of operations include a recovery operation, the recovery operation recovering the signal processing circuit from the sleep state, and,
upon detecting that the voltage level is higher than the reference voltage and lower than the preset first threshold voltage, the requested-operation determination circuit determines that the one operation is the recovery operation.

4. The accessory according to claim 2,
wherein the plurality of operations include a sleep operation, the sleep operation switching the running signal processing circuit into the sleep state, and
when the voltage level, higher than the reference voltage, lowers to the reference voltage, the requested-operation determination circuit determines that the one operation is the sleep operation.

5. A power management integrated circuit (IC) that is included in an accessory and connected to a case with a charging line and a GND line, the accessory operating on electric power, the case being capable of supplying the electric power, the charging line transmitting and receiving a charging signal, the GND line being set to a reference voltage, the power management IC comprising:
a memory storing to a preset first threshold voltage, a preset second threshold voltage, a preset first threshold period, a preset second threshold period, and a preset third threshold period; and
a requested-operation determination circuit that, based on a voltage level of the charging signal relative to the preset first threshold voltage and the preset second threshold voltage and based on a duration time of the voltage level relative to the preset first threshold period, the preset second threshold period, and the preset third threshold period, determines one operation requested of the accessory, the one operation being one of a plurality of operations.

6. The power management IC according to claim 5,
wherein the accessory includes an accessory battery and a signal processing circuit, the accessory battery being chargeable by the charging signal, the signal processing circuit being able to process the charging signal inputted from the case and switch into a sleep state,
the plurality of operations include an initialization operation, a charging operation, and a communication operation, the initialization operation initializing a system of the accessory, the charging operation charging the accessory battery, the communication operation providing one-way communication from the case to the requested-operation determination circuit and two-way communication between the signal processing circuit and the case,
when the voltage level has remained higher than the reference voltage and lower than the preset first threshold voltage for the preset first threshold period, the requested-operation determination circuit determines that the one operation is the communication operation,
when the voltage level has remained not lower than the preset first threshold voltage for the preset second threshold period, the requested-operation determination circuit determines that the one operation is the charging operation, and,
when the voltage level has remained not lower than the preset second threshold voltage for the preset third threshold period, the requested-operation determination circuit determines that the one operation is the initialization operation, the preset second threshold voltage being set higher than the preset first threshold voltage.

7. The power management IC according to claim 6,
wherein the plurality of operations include a recovery operation, the recovery operation recovering the signal processing circuit from the sleep state, and,
upon detecting that the voltage level is higher than the reference voltage and lower than the preset first threshold voltage, the requested-operation determination circuit determines that the one operation is the recovery operation.

8. The power management IC according to claim 6,
wherein the plurality of operations include a sleep operation, the sleep operation switching the running signal processing circuit into the sleep state, and
when the voltage level, higher than the reference voltage, lowers to the reference voltage, the requested-operation determination circuit determines that the one operation is the sleep operation.

9. A communication system comprising:
a case that is capable of supplying electric power; and
an accessory that is connectable to the case with a charging line and a GND line, the charging line transmitting and receiving a charging signal, the GND line being set to a reference voltage,
wherein the accessory includes a requested-operation determination circuit that, based on a voltage level of the charging signal relative to a preset first threshold voltage and a preset second threshold voltage and based on a duration time of the voltage level relative to a preset first threshold period, a preset second threshold period, and a preset third threshold period, determines one operation requested of the accessory, the one operation being one of a plurality of operations.

10. The communication system according to claim 9,
wherein the accessory includes an accessory battery and a signal processing circuit, the accessory battery being chargeable by the charging signal, the signal processing circuit being able to process the charging signal inputted from the case and switch into a sleep state,
the plurality of operations include an initialization operation, a charging operation, and a communication operation, the initialization operation initializing a system of the accessory, the charging operation charging the accessory battery, the communication operation providing one-way communication from the case to the requested-operation determination circuit and two-way communication between the signal processing circuit and the case,
when the voltage level has remained higher than the reference voltage and lower than the preset first threshold voltage for the preset first threshold period, the requested-operation determination circuit determines that the one operation is the communication operation,
when the voltage level has remained not lower than the preset first threshold voltage for the preset second threshold period, the requested-operation determination circuit determines that the one operation is the charging operation, and,
when the voltage level has remained not lower than the preset second threshold voltage for the preset third threshold period, the requested-operation determination circuit determines that the one operation is the initialization operation, the preset second threshold voltage being set higher than the preset first threshold voltage.

11. The communication system according to claim 10,
wherein the plurality of operations include a recovery operation, the recovery operation recovering the signal processing circuit from the sleep state, and,
upon detecting that the voltage level is higher than the reference voltage and lower than the preset first threshold voltage, the requested-operation determination circuit determines that the one operation is the recovery operation.

12. The communication system according to claim 10,
wherein the plurality of operations include a sleep operation, the sleep operation switching the signal processing circuit into the sleep state, and
when the voltage level, higher than the reference voltage, lowers to the reference voltage, the requested-operation determination circuit determines that the one operation is the sleep operation.

13. A communication system comprising:
a case that is capable of supplying electric power;
an accessory that operates on the electric power; and
a power management integrated circuit (IC) that is included in the accessory and connected to the case with a charging line and a GND line, the charging line transmitting and receiving a charging signal, the GND line being set to a reference voltage,
wherein the power management IC includes a requested-operation determination circuit that, based on a voltage level of the charging signal relative to a preset first threshold voltage and a preset second threshold voltage and based on a duration time of the voltage level relative to a preset first threshold period, a preset second threshold period, and a preset third threshold period, determines one operation requested of the accessory, the one operation being one of a plurality of operations.

14. The communication system according to claim 13,
wherein the accessory includes an accessory battery and a signal processing circuit, the accessory battery being chargeable by the charging signal, the signal processing circuit being able to process the charging signal inputted from the case and switch into a sleep state,
the plurality of operations include an initialization operation, a charging operation, and a communication operation, the initialization operation initializing a system of the accessory, the charging operation charging the accessory battery, the communication operation providing one-way communication from the case to the requested-operation determination circuit and two-way communication between the signal processing circuit and the case,
when the voltage level has remained higher than the reference voltage and lower than the preset first threshold voltage for the preset first threshold period, the requested-operation determination circuit determines that the one operation is the communication operation,
when the voltage level has remained not lower than the preset first threshold voltage for the preset second threshold period, the requested-operation determination circuit determines that the one operation is the charging operation, and,
when the voltage level has remained not lower than the preset second threshold voltage for the preset third threshold period, the requested-operation determination circuit determines that the one operation is the initialization operation, the preset second threshold voltage being set higher than the preset first threshold voltage.

15. The communication system according to claim 14,
wherein the plurality of operations include a recovery operation, the recovery operation recovering the signal processing circuit from the sleep state, and,
upon detecting that the voltage level is higher than the reference voltage and lower than the preset first threshold voltage, the requested-operation determination circuit determines that the one operation is the recovery operation.

16. The communication system according to claim 14,
wherein the plurality of operations include a sleep operation, the sleep operation switching the signal processing circuit into the sleep state, and
when the voltage level, higher than the reference voltage, lowers to the reference voltage, the requested-operation determination circuit determines that the one operation is the sleep operation.

\* \* \* \* \*